(12) United States Patent
Fujiwara et al.

(10) Patent No.: US 11,957,294 B2
(45) Date of Patent: Apr. 16, 2024

(54) BLOWER APPARATUS AND VACUUM CLEANER

(71) Applicant: Nidec Corporation, Kyoto (JP)

(72) Inventors: Akikazu Fujiwara, Kyoto (JP); Motoi Sawasaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 106 days.

(21) Appl. No.: 17/471,222

(22) Filed: Sep. 10, 2021

(65) Prior Publication Data

US 2022/0079401 A1 Mar. 17, 2022

(30) Foreign Application Priority Data

Sep. 17, 2020 (JP) .................................. 2020-156792
Nov. 2, 2020 (JP) .................................. 2020-183557

(51) Int. Cl.
*A47L 5/14* (2006.01)
*A47L 5/22* (2006.01)
*A47L 9/08* (2006.01)
*A47L 9/22* (2006.01)

(52) U.S. Cl.
CPC ..................................... *A47L 5/14* (2013.01);
*A47L 5/22* (2013.01); *A47L 9/08* (2013.01);
*A47L 9/22* (2013.01)

(58) Field of Classification Search
CPC ..................................... A47L 5/22; A47L 9/22
See application file for complete search history.

(56) References Cited

U.S. PATENT DOCUMENTS

| | | | |
|---|---|---|---|
| 2016/0037984 A1* | 2/2016 | Park ..................... | F04D 29/626 |
| | | | 15/326 |
| 2019/0165651 A1* | 5/2019 | Kishi ................... | H02K 5/1732 |
| 2020/0217367 A1* | 7/2020 | Ikeno ................... | H02K 5/1732 |

* cited by examiner

*Primary Examiner* — Andrew A Horton
(74) *Attorney, Agent, or Firm* — Keating & Bennett, LLP

(57) ABSTRACT

A blower apparatus includes a motor including a rotor including a shaft extending along a vertically extending central axis, and a stator opposing the rotor in a radial direction, an impeller below the stator and fixed to the shaft, and a housing surrounding an outer side of the impeller in the radial direction. The impeller includes a base portion that widens in a direction intersecting the central axis, and blades arranged on an upper surface of the base portion along a circumferential direction. An annulus is fixed to an upper end portion of the shaft.

10 Claims, 18 Drawing Sheets

BLOWER APPARATUS AND VACUUM CLEANER

CROSS-REFERENCE TO RELATED APPLICATIONS

The present application claims priority under 35 U.S.C. § 119 to Japanese Patent Application No. 2020-156792, filed on Sep. 17, 2020, and Japanese Patent Application No. 2020-183557, filed on Nov. 2, 2020, the entire contents of which are hereby incorporated herein by reference.

1. FIELD OF THE INVENTION

The present disclosure relates to a blower apparatus and a vacuum cleaner including the blower apparatus.

2. BACKGROUND

As an electric blower of the related art, a configuration including a rotor, a stator, and an impeller attached to a rotating shaft, and including a flat member and a balance adjusting member has been known.

However, in the above-described electric blower, it is difficult to efficiently correct the balance of the rotor at an upper end portion and a lower end portion of a shaft.

SUMMARY

A blower apparatus according to an example embodiment of the present disclosure includes a motor that includes a rotor including a shaft extending along a vertically extending central axis, and a stator opposing the rotor in a radial direction, an impeller that is below the stator, and is fixed to the shaft, and a housing that surrounds an outer side of the impeller in the radial direction. The impeller includes a base portion that widens in a direction intersecting the central axis, blades arranged on an upper surface of the base portion along a circumferential direction, and an annulus fixed to an upper end portion of the shaft.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described in detail with reference to the accompanying drawings. In the present specification, in a blower apparatus 100, a direction parallel to a central axis Cx of the blower apparatus 100 is referred to by an "axial direction", a direction orthogonal to the central axis Cx of the blower apparatus 100 is referred to a "radial direction", and a direction along a circular arc having the central axis Cx of the blower apparatus 100 is referred to a "circumferential direction". In the present specification, in the blower apparatus 100, the axial direction is defined as a vertical direction, and an intake side of a housing 30 with respect to an impeller 20 is defined as an upper side. The vertical direction is merely a direction for description, and does not limit a positional relationship and a direction in a use state of the blower apparatus 100. "Upstream" and "downstream" respectively indicate upstream and downstream of an airflow generated when the impeller 20 is rotated.

In the blower apparatus 100, the impeller 20 rotates about the central axis Cx in the circumferential direction. In the present specification, in a rotation direction Rt of the impeller 20, a rotation destination is referred to as a "front side in a rotation direction", and a rotation front is referred to as a "rear side in the rotation direction". In other words, when a certain point on the impeller 20 is set as a reference, a side where the point reaches after a predetermined time elapses is defined as the front side in the rotation direction Rt, and a side where the point has already passed is defined as the rear side in the rotation direction Rt.

Figure 1:
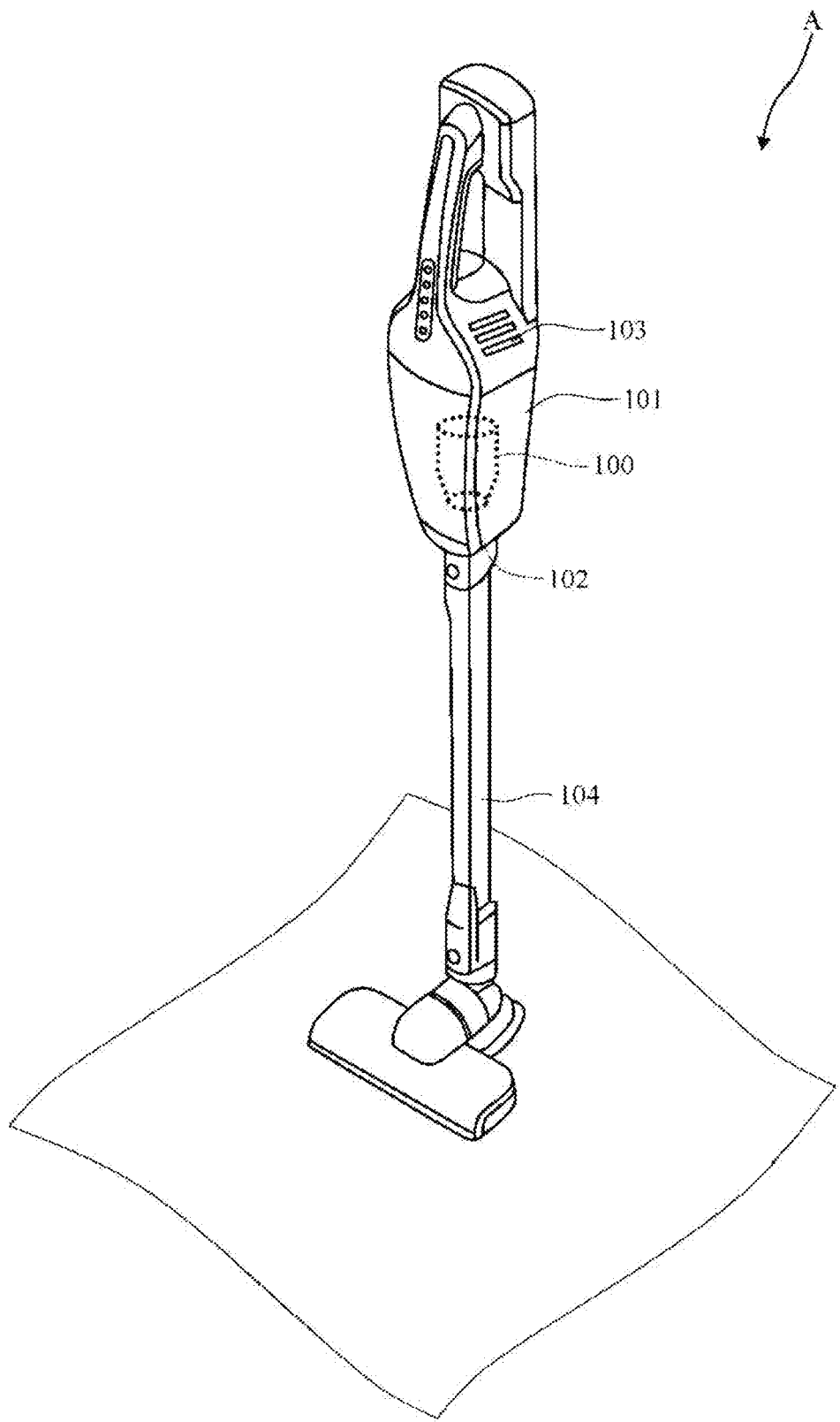
FIG. 1 is a perspective view of a vacuum cleaner according to an example embodiment of the present disclosure.

FIG. 1 is a perspective view of a vacuum cleaner according to the present example embodiment. As illustrated in FIG. 1, a vacuum cleaner A according to the present example embodiment is a so-called stick type vacuum cleaner, and includes a housing 101 in which the blower apparatus 100 is disposed and an air passage (not illustrated) is formed. In the housing 101, an intake portion 102 and an exhaust portion 103 are opened. A suction pipe 104 having a tubular shape is connected to the intake portion 102. The vacuum cleaner A is not limited to the stick type, and may be a so-called robot type, canister type, or handy type vacuum cleaner. That is, the vacuum cleaner A includes the blower apparatus 100. Accordingly, in the blower apparatus 100 mounted on the vacuum cleaner A, a decrease in blowing efficiency can be suppressed.

Figure 2:
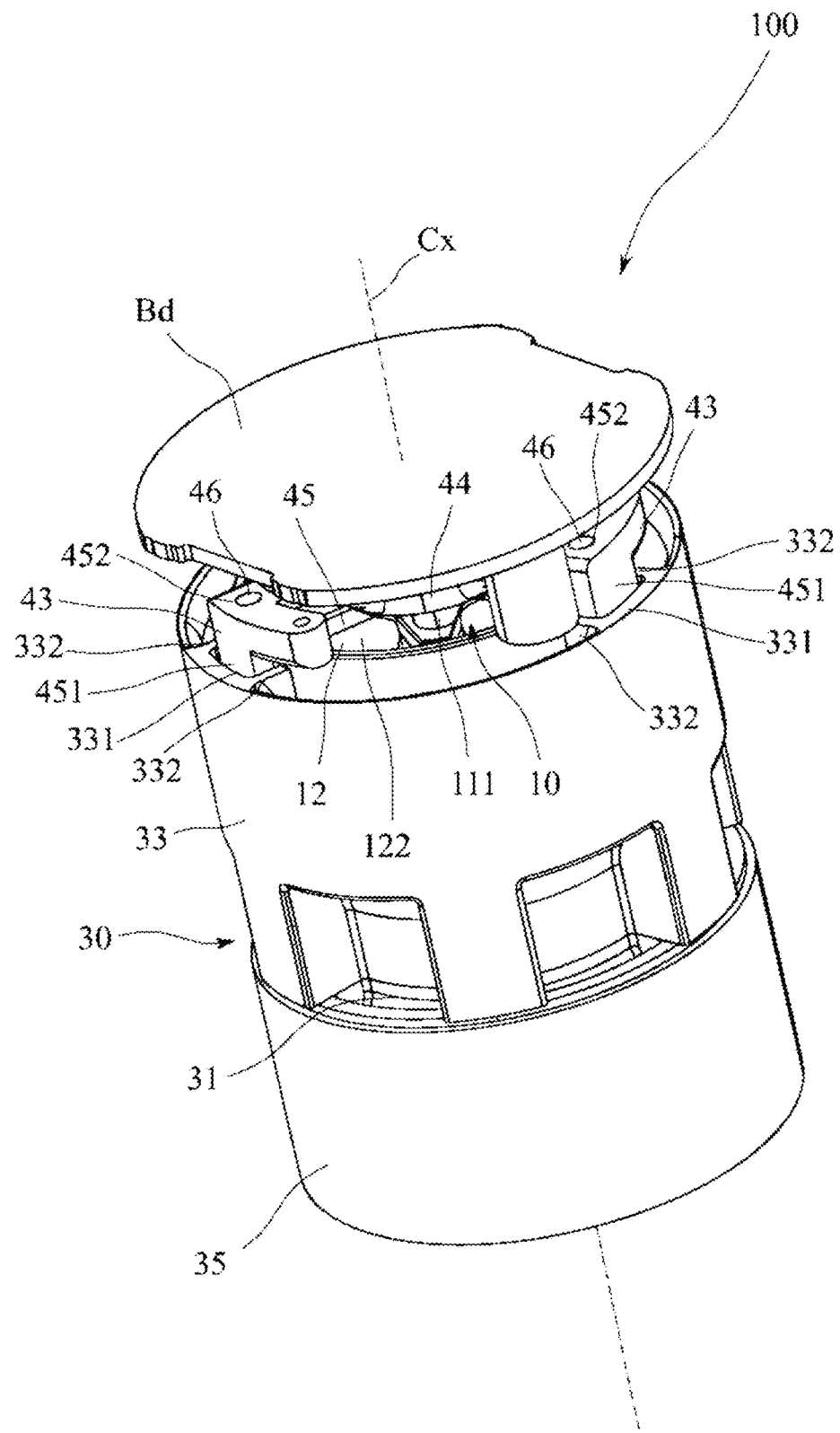
FIG. 2 is a perspective view of a blower apparatus according to an example embodiment of the present disclosure.
Figure 3:
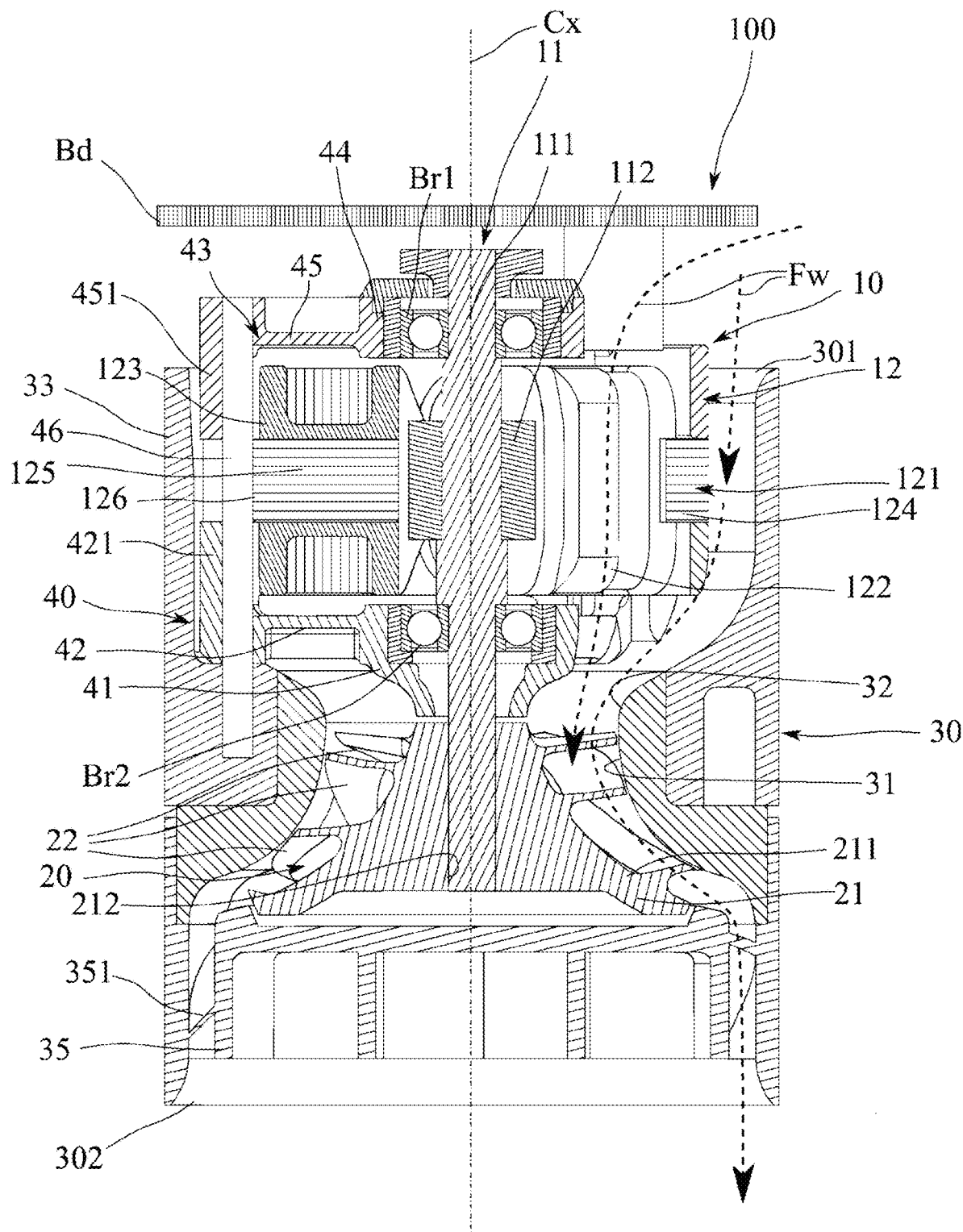
FIG. 3 is a cross-sectional view of the blower apparatus illustrated in FIG. 2.
Figure 4:
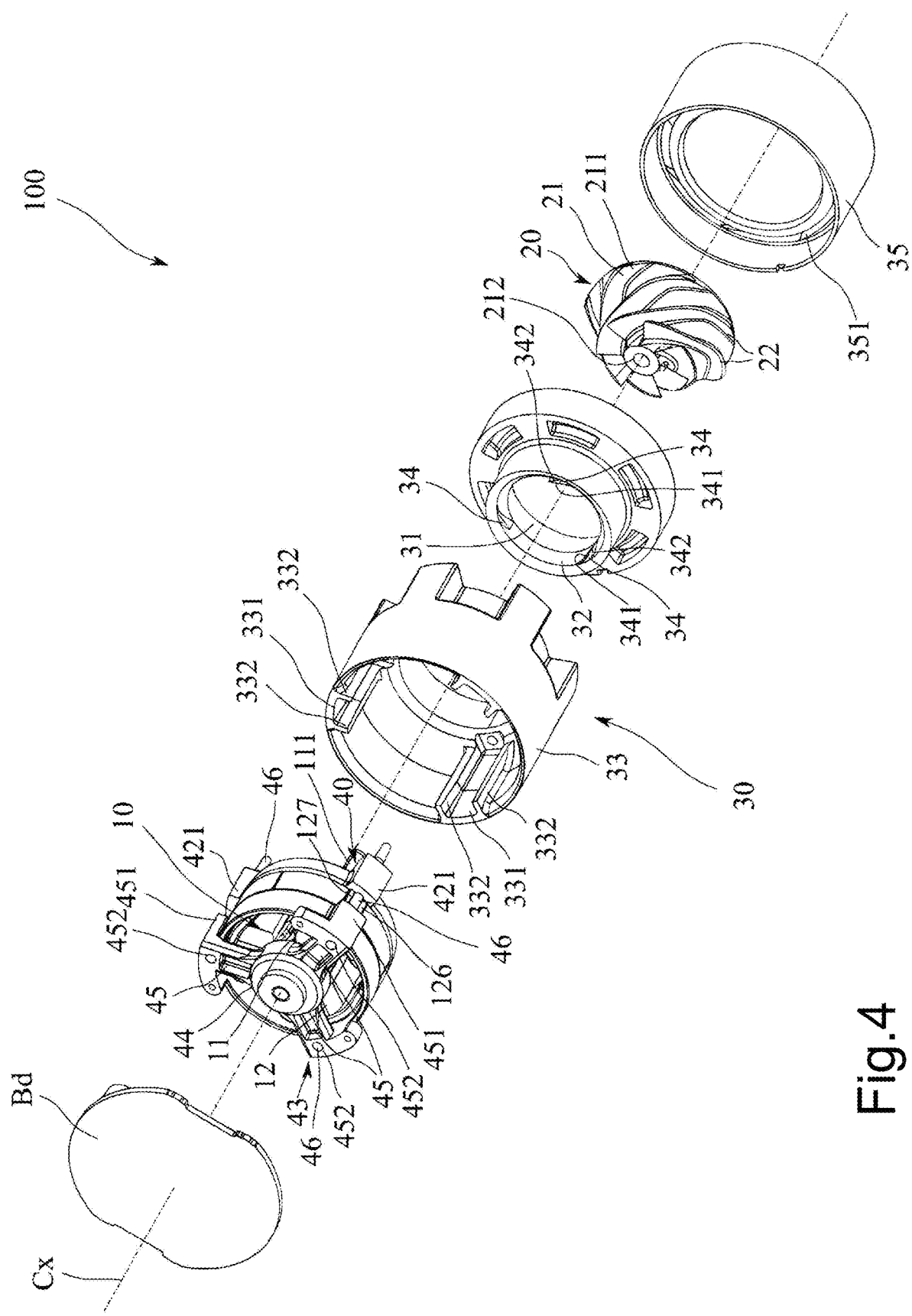
FIG. 4 is an exploded perspective view of the blower apparatus.
Figure 5:
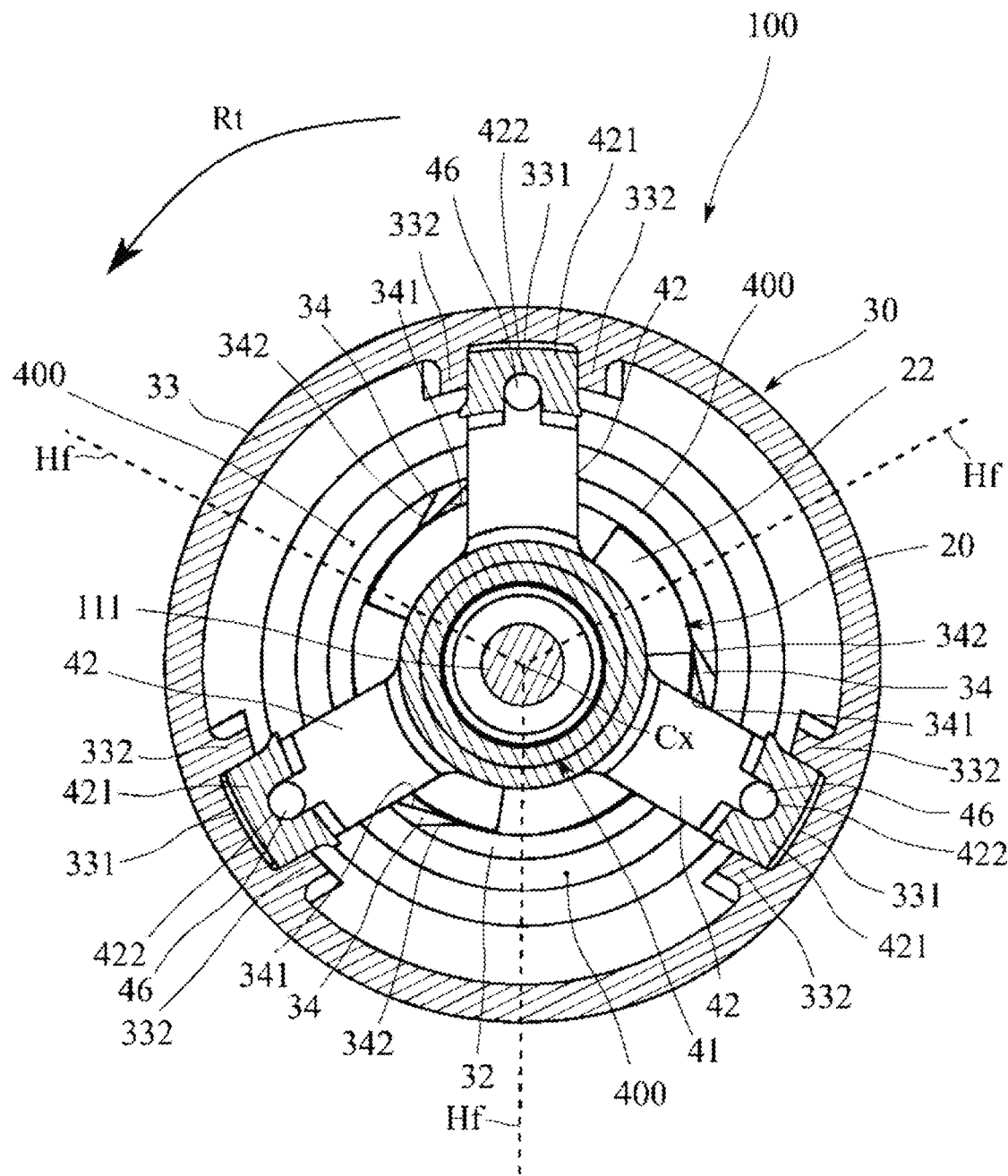
FIG. 5 is a cross-sectional view taken along a cross section orthogonal to a central axis of the blower apparatus.
Figure 6:
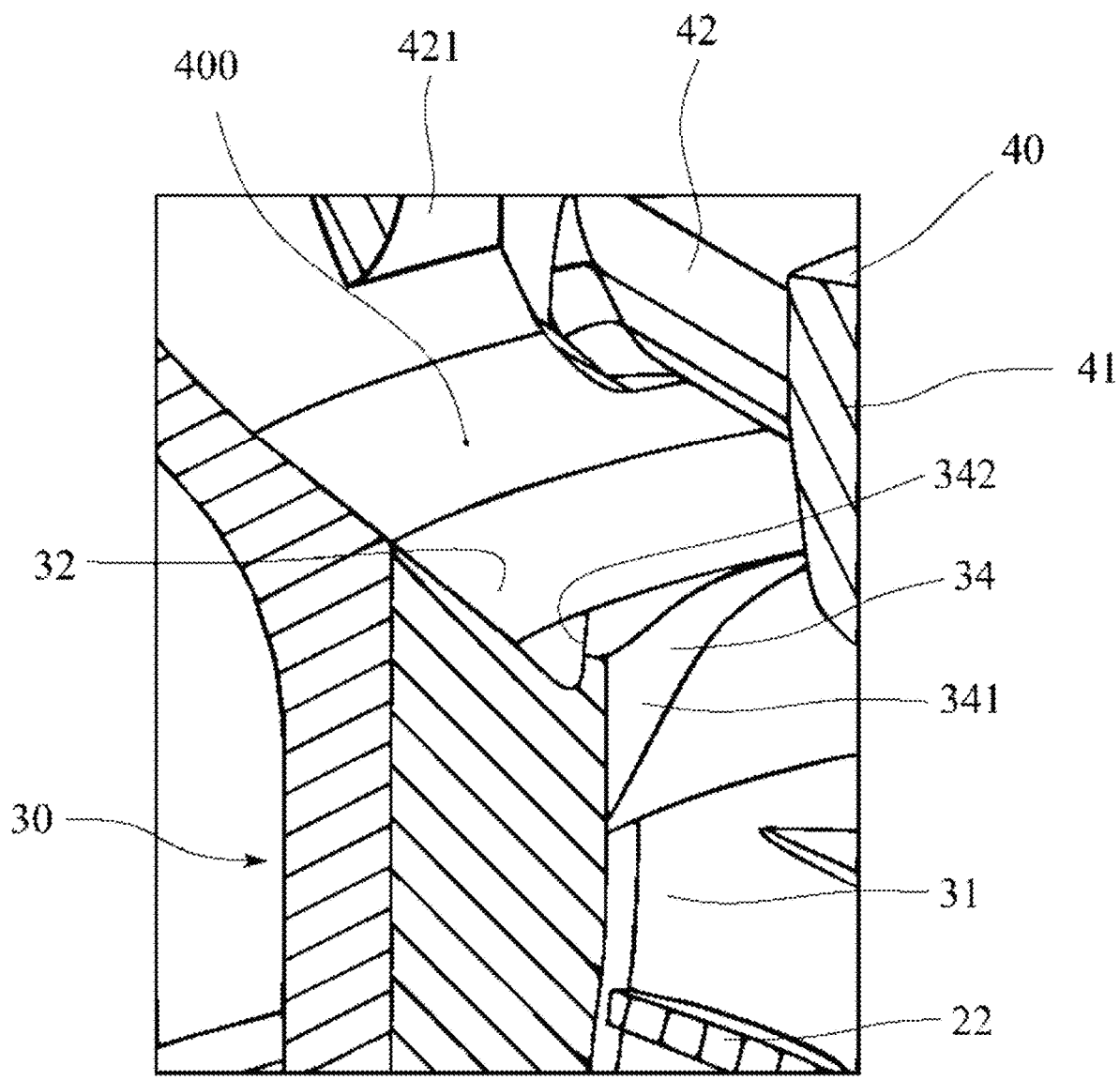
FIG. 6 is an enlarged cross-sectional view of a protrusion according to an example embodiment of the present disclosure.
Figure 7:
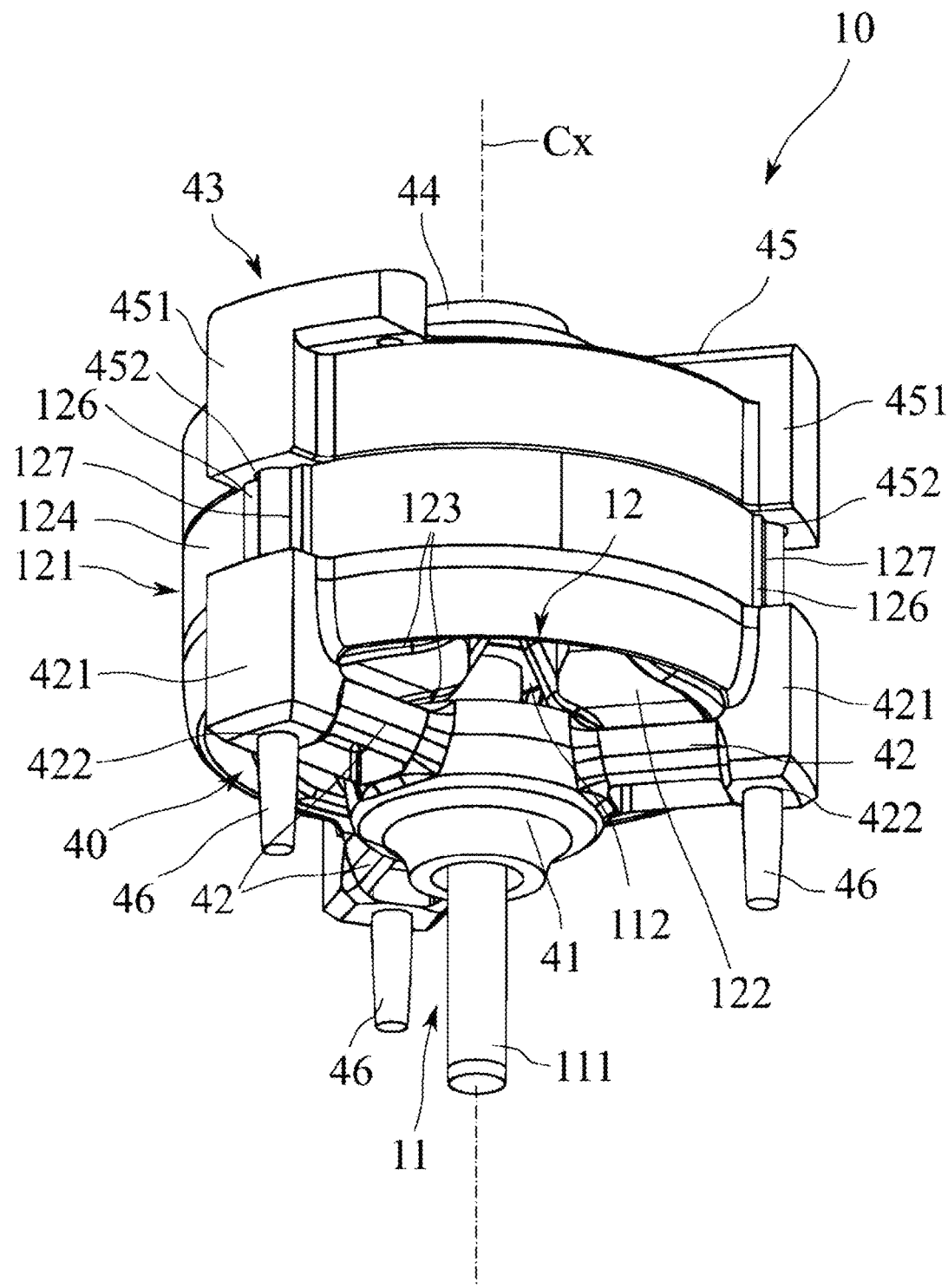
FIG. 7 is a perspective view of a motor according to an example embodiment of the present disclosure as viewed from below.

FIG. 2 is a perspective view of the blower apparatus 100. FIG. 3 is a cross-sectional view of the blower apparatus 100 illustrated in FIG. 2. FIG. 4 is an exploded perspective view of the blower apparatus 100. FIG. 5 is a cross-sectional view taken along a cross section orthogonal to the central axis Cx of the blower apparatus 100. FIG. 6 is an enlarged cross-sectional view of a protrusion 34. FIG. 7 is a perspective view of a motor 10 as viewed from below. As illustrated in FIGS. 2 to 4, the blower apparatus 100 includes the motor 10, the impeller 20, the housing 30, a motor housing 40, and a circuit board Bd.

As illustrated in FIG. 3, the motor 10 is disposed above the impeller 20. As illustrated in FIG. 4, the motor 10 is a so-called inner rotor type motor. The motor 10 includes a rotor 11 and a stator 12.

As illustrated in FIG. 3, the rotor 11 includes a shaft 111 and a rotor core 112 fixed to an outer peripheral surface of the shaft 111. The shaft 111 has a cylindrical shape. The shaft 111 is disposed along the central axis Cx. That is, the rotor 11 includes the shaft 111 disposed along the central axis Cx. The impeller 20 is fixed to a lower end portion of the shaft 111. The shaft 111 is rotatably supported by the motor housing 40 via an upper bearing Br1 and a lower bearing Br2.

The stator 12 is disposed to surround an outer side of the rotor 11 in the radial direction. That is, the stator 12 is disposed to face the rotor 11 in the radial direction. The stator 12 includes a stator core 121, and coils 122. The stator core 121 has an annular core back 124 and a plurality of teeth 125 extending to an inner side in the radial direction from an inner surface of the core back 124. The coils 122 are formed by winding conductive wires around the teeth 125 via insulators 123. The stator 12 of the present example embodiment has three teeth 125, that is, three coils 122.

As illustrated in FIGS. 3, 4, and 7, a lower portion of the motor 10 is held by the motor housing 40. An upper portion of the motor 10 is held by a motor cover 43. The motor housing 40 includes a bearing holding portion 41 and three ribs 42.

As illustrated in FIG. 7 and the like, the bearing holding portion 41 is disposed below the stator 12. An outer ring of the lower bearing Br2 is directly or indirectly fixed to the bearing holding portion 41. That is, the bearing holding portion 41 is disposed below the stator 12 and rotatably holds the shaft 111 via the lower bearing Br2. The plurality of ribs 42 extends to the outer side in the radial direction from an outer surface of the bearing holding portion 41. In the motor housing 40 of the present example embodiment, the number of ribs 42 is three. However, the number of ribs is not limited to three. The three ribs 42 extend to the outer side in the radial direction from the outer surface of the bearing holding portion 41 in the radial direction. The three ribs 42 are arranged in the circumferential direction, that is, in the rotation direction of the impeller 20. That is, the plurality of ribs 42 is arranged in the circumferential direction and extends to the outer side in the radial direction from the bearing holding portion 41. Each rib 42 has a column portion 421 extending to an upper side in the axial direction from an outer edge in the radial direction. The column portion 421 has a hole 422 penetrating in the axial direction, and a pin 46 penetrates the hole 422.

As illustrated in FIGS. 4, 7, and the like, the motor cover 43 includes an upper bearing holding portion 44 and a plurality of upper ribs 45. The upper bearing holding portion 44 is disposed above the motor 10. An outer ring of the upper bearing Br1 is directly or indirectly fixed to the upper bearing holding portion 44. The number of upper ribs 45 is the same as the number of ribs 42, that is, three. The three upper ribs 45 extend to the outer side in the radial direction from an outer surface of the upper bearing holding portion 44. The three upper ribs 45 are arranged in the circumferential direction. Each of the upper ribs 45 has an upper column portion 451 extending to a lower side in the axial direction from an outer edge in the radial direction. The column portion 421 and the upper column portion 451 face each other in the axial direction. The upper column portion 451 has a hole 452 penetrating in the axial direction, and the pin 46 penetrates the hole 452.

As illustrated in FIGS. 3 and 4, an upper end surface of the column portion 421 and a lower end surface of the upper column portion 451 protrude to the outer side in the radial direction from an outer surface of the stator core 121, and sandwich, in the axial direction, three stator protrusions 126 arranged in the circumferential direction. A groove 127 recessed on the inner side in the radial direction is formed on an end surface on the outer side of the stator protrusion 126 in the radial direction. The number of stator protrusions 126 is the same as the number of ribs 42 and the number of upper ribs 45.

As illustrated in FIGS. 3 and 4, the motor housing 40 and the motor cover 43 are attached to a motor housing fixing portion 33 disposed above an enlarged portion 32 of the housing 30. The motor housing fixing portion 33 has three fixing portions 331 arranged in the circumferential direction. Each fixing portion 331 has a pair of attachment protrusions 332 protruding in the radial direction and extending in the axial direction. The pair of attachment protrusions 332 are arranged at the same interval as widths of the column portion 421 and the upper column portion 451 in the circumferential direction.

The lower portion of the motor 10 is held by the motor housing 40 and the upper portion thereof is held by the motor cover 43, and the pin 46 is inserted into the hole 422 of the column portion 421 and the hole 452 of the upper column portion 451. At this time, the pin 46 is also inserted into the groove 127 of the stator protrusion 126. Accordingly, the motor 10 is held by the motor housing 40 and the motor cover 43. The column portion 421 and the upper column portion 451 are arranged between the pair of attachment protrusions 332. A lower end of the pin 46 is fixed to the housing 30, and thus, the motor housing 40 and the motor cover 43 that hold the motor 10 are fixed to the motor housing fixing portion 33. That is, the motor housing 40 is fixed to the housing 30. For fixing the pin 46 to the housing 30, a method capable of firmly fixing the pin to the housing, such as press fitting, welding, or screwing, can be widely adopted.

The motor housing 40 and the motor cover 43 are attached to the motor housing fixing portion 33, and thus, the lower end of the shaft 111 is disposed inside a shroud portion 31 disposed in a lower portion of the housing 30. The impeller 20 is fixed to the lower end of the shaft 111 disposed inside the shroud portion 31. That is, the impeller 20 is disposed below the stator 12 and is fixed to the shaft 111. The column portion 421 and the upper column portion 451 may be connected or may be integrated.

Accordingly, an outer surface of the core back 124 in the radial direction is held by the motor housing 40. That is, the motor housing 40 holds the stator 12. Upper and lower portions of the shaft 111 from the stator 12 are rotatably supported by the motor housing 40 via the upper bearing Br1 and the lower bearing Br2, respectively. With such a configuration, since air flows between the ribs 42, a channel can be widened, and the stator 12 can be effectively cooled. Accordingly, the motor 10 can be effectively cooled.

The impeller 20 includes a base portion 21 and a plurality of blades 22. The base portion 21 has a circular shape as viewed in the axial direction. That is, the base portion 21 expands in a direction intersecting the central axis Cx. An upper surface 211 of the base portion 21 comes into contact with the central axis Cx as it goes to the upper side in the axial direction. As viewed in the axial direction, a through-hole 212 penetrating in the axial direction is provided at a center of the base portion 21. The lower end of the shaft 111 is press-fitted into the through-hole 212, and thus, the impeller 20 is fixed to the shaft 111. The fixing of the shaft 111 and the impeller 20 is not limited to press fitting, and bonding, adhesion, welding, screwing, and the like can be widely adopted. The plurality of blades 22 is arranged in the circumferential direction on the upper surface 211 of the base portion 21. That is, the plurality of blades 22 is arranged in the circumferential direction on the upper surface of the base portion 21. The plurality of blades 22 may be a single member with the base portion 21, or the blades 22 may be formed as a separate member from the base portion 21 and may be fixed by a fixing method such as adhesion, press fitting, or welding.

The impeller 20 is disposed inside the shroud portion 31. That is, the housing 30 surrounds the outer side of the impeller 20 in the radial direction. As illustrated in FIGS. 3 and 4, the housing 30 has a tubular shape, and has an opened upper end and an opened lower end. In the housing 30, the opening at the upper end is a suction port 301 for sucking gas, and the opening at the lower end is a discharge port 302 for discharging gas. The housing 30 includes the shroud portion 31 and the enlarged portion 32. The housing 30 includes the motor housing fixing portion 33 and protrusions 34.

The shroud portion 31 surrounds the outer side of the impeller 20 in the radial direction. That is, the housing 30 has the shroud portion 31 disposed on the outer side of the blade 22 in the radial direction. The shroud portion 31 guides an airflow Fw generated by the impeller 20. As illustrated in FIG. 3, the shroud portion 31 has a curved surface shape in which the shroud portion comes into contact with the central axis Cx as it goes to the upper side and an inclination angle with respect to the central axis Cx becomes gentle as it goes to the upper side. Accordingly, an inner peripheral surface of the shroud portion 31 faces, in the radial direction, an outer edge of the blade 22 in the radial direction with a certain gap interposed therebetween. That is, the inner peripheral surface of the shroud portion 31 has a shape in which the airflow Fw is effectively generated when the impeller 20 rotates.

The enlarged portion 32 is disposed above the shroud portion 31. The enlarged portion 32 has an inner surface that expands to the outer side in the radial direction as it goes to the upper side. That is, the enlarged portion 32 is disposed above the shroud portion 31 and separates from the central axis Cx as it goes to the upper side. That is, the enlarged portion 32 serves as a bell mouth that sucks air. In the housing 30 of the present example embodiment, the enlarged portion 32 is disposed above an upper end of the impeller 20. With this configuration, a sufficient distance can be secured between the impeller 20 and the protrusions 34. Accordingly, the impeller 20 and the inner peripheral surface of the shroud portion 31 can be brought into contact with each other, and thus, it is possible to suppress the decrease in the blowing efficiency (blowing amount).

As illustrated in FIG. 3, the enlarged portion 32 of the housing 30 is disposed below the rib 42 of the motor housing 40. As illustrated in FIG. 5, the plurality of protrusions 34 protruding in a direction approaching the central axis Cx is arranged in the rotation direction of the impeller 20 on the inner side surface of the enlarged portion 32. The protrusions 34 guide the airflow Fw toward the central axis Cx.

As illustrated in FIGS. 3 and 4, the housing 30 has a flow rectifying portion 35 below the shroud portion 31. The flow rectifying portion 35 includes a stator blade 351 therein and rectifies the airflow Fw passing through the inside. A lower end of the flow rectifying portion 35 forms the discharge port 302.

As illustrated in FIG. 2, the circuit board Bd is disposed above the housing 30. For example, a driver circuit (not illustrated) that supplies a power to the coil 122 is mounted on the circuit board Bd. In addition, other circuits, for example, a position detection element that detects a position of the rotor 11 may be mounted.

In the blower apparatus 100, the impeller 20 rotates inside the shroud portion 31 by supplying the power to the motor 10. The impeller 20 rotates, and thus, the air is sucked from the suction port 301, the airflow Fw is generated inside the housing 30. The airflow Fw flows toward the flow rectifying portion 35, and is discharged from the discharge port 302.

The circuit board Bd is cooled by the air sucked into the suction port 301. The motor 10, the upper bearing Br1, and the lower bearing Br2 are cooled by the air sucked from the suction port 301. The circuit board Bd, the motor 10, the upper bearing Br1, and the lower bearing Br2 are arranged on the suction side of the impeller 20, and are cooled by the uncompressed airflow Fw. Thus, the circuit board Bd, the motor 10, the upper bearing Br1, and the lower bearing Br2 are arranged on the discharge side of the impeller 20, are cooled by the airflow Fw at a lower temperature than that when the compressed airflow Fw is blown, and are efficiently cooled.

The ribs 42 of the motor housing 40 are arranged at a lower end of the motor housing fixing portion 33. A flow of the airflow Fw inside the motor housing fixing portion 33 flows into the enlarged portion 32 from an opening 400 between the ribs 42 arranged in the circumferential direction. The airflow Fw flows into the shroud portion 31 from the enlarged portion 32 (see FIG. 6).

When the impeller 20 rotates inside the shroud portion 31, the blades 22 compress the air. At this time, a pressure below the blade 22 is higher than a pressure above the blade. Thus, in a boundary region between the shroud portion 31 and the enlarged portion 32, air may flow from the lower side to the upper side of the blade 22 and a vortex may be generated in the gap between the outer edge of the blade 22 in the radial direction and the inner peripheral surface of the shroud portion 31. Since the vortex generated in the boundary region between the shroud portion 31 and the enlarged portion 32 moves in the circumferential direction with the rotation of the impeller 20, the vortex hardly flows to the lower side, and the decrease in the blowing efficiency is caused.

In the blower apparatus 100 of the present example embodiment, a part of the airflow Fw forming the vortex is guided on the inner side in the radial direction by the protrusions 34 provided on the inner surface of the enlarged portion 32. The airflow Fw guided on the inner side in the radial direction by the protrusions 34 is sent to the lower side by the blades 22 of the impeller 20. Accordingly, the airflow Fw staying, as the vortex, in an upper portion of the shroud portion 31 can be reduced, and the decrease in the blowing efficiency can be suppressed. Details of the protrusion 34 will be described below.

The details of the protrusion 34 will be described. As illustrated in FIGS. 5 and 6, each protrusion 34 has a surface 341 on the rear side in the rotation direction Rt of the impeller 20 (hereinafter, may be referred to as a rear surface 341) and a surface 342 on the front side in the rotation direction Rt (hereinafter, may be referred to as a front surface 342). The rear surface 341 of the protrusion 34, that is, the surface 341 on the rear side in the rotation direction Rt of the protrusion 34 approaches the central axis Cx as it goes to the front side in the rotation direction Rt.

The rear surface 341 may be a flat surface or may be a curved surface. In the case of the curved surface, it is preferable to have a shape recessed to the outer side in the radial direction. The rear surface 341 of the protrusion 34 guides a part of the airflow Fw flowing from the lower side to the upper side of the impeller 20 toward the central axis Cx by the protrusion 34 in the gap between the impeller 20 and the shroud portion 31. Accordingly, the vortex can be reduced, and the decrease in the blowing efficiency (blowing amount) can be suppressed.

As illustrated in FIGS. 3, 5, and the like, the protrusion 34 becomes thinner as it goes to the inner side in the radial direction, in other words, the front side in the rotation direction Rt. That is, a length in the rotation direction Rt at an outer end portion of the protrusion 34 in the radial direction is longer than a length in the rotation direction Rt of an inner end portion of the protrusion 34 in the radial direction. Accordingly, the protrusion 34 can enhance the rigidity of a portion connected to the enlarged portion 32, and the protrusion 34 is less likely to be deformed when the airflow Fw is guided toward the central axis Cx. Accordingly, the vortex can be reduced, and the decrease in the blowing efficiency (blowing amount) can be suppressed.

As described above, the enlarged portion 32 is disposed below the rib 42 of the motor housing 40. Since a part of the airflow Fw passes through the opening 400 between the ribs 42 arranged in the circumferential direction and flows from the motor housing fixing portion 33 to the enlarged portion 32, a flow rate of the airflow Fw is small immediately below the rib 42. Thus, immediately below the rib 42, a pressure difference between the upper side and the lower side of the blade 22 increases, a flow rate of the airflow flowing from the lower side to the upper side easily increases, and the vortex is likely to be generated.

As shown in FIG. 5, in the blower apparatus 100 of the present example embodiment, the number of the plurality of protrusions 34 and the number of the plurality of ribs 42 are the same. One protrusion 34 is disposed below each rib 42. A part of each protrusion 34 is disposed to overlap the rib 42 disposed above in the axial direction. Further, an end portion of the protrusion 34 on the front side in the rotation direction Rt is disposed on the front side in the rotation direction Rt from the rib 42 disposed on the upper side. With this arrangement, the airflow Fw flowing from the lower side to the upper side of the blade 22 below the rib 42 can be efficiently guided as it goes toward the central axis Cx.

Accordingly, the vortex can be reduced, and the decrease in the blowing efficiency can be suppressed. In addition, since one protrusion 34 is provided below each rib 42, a force acting on the protrusion 34 from the airflow Fw is dispersed as compared with a case where the number of protrusions 34 is larger than the number of ribs 42. Thus, the vibration of the housing 30 can also be suppressed.

In the blower apparatus 100, a flow velocity of the airflow Fw can be changed by a rotation speed of the impeller 20. In particular, when the flow velocity is low, there is a tendency to be easily affected by a channel resistance. Thus, the protrusions 34 which become channel resistance are arranged below the ribs 42 where the vortex is likely to be generated one by one, and thus, an increase in the channel resistance can be suppressed. In particular, it is difficult to suppress the inflow airflow Fw at a low flow rate, and it is possible to suppress the decrease in the blowing efficiency.

The airflow Fw from the motor housing fixing portion 33 passes through the opening 400 between the ribs 42 arranged in the circumferential direction and flows into the enlarged portion 32. In the present example embodiment, the surface 342 of the protrusion 34 on the front side in the rotation direction Rt approaches the central axis as it goes to the front side in the rotation direction Rt. With this configuration, the channel of the airflow Fw flowing from the motor housing fixing portion 33 into the enlarged portion 32 can be expanded, and the inflow amount of the airflow Fw can be improved. That is, the decrease in the blowing efficiency can be suppressed. The front surface 342 may be a flat surface or a curved surface. The front surface may be formed in accordance with a shape of the rear surface 341.

Further, the protrusions 34 may be disposed below the opening 400 on the rear side in the rotation direction Rt with respect to a center Hf (see FIG. 5) in the rotation direction Rt. That is, the number of the plurality of protrusions 34 and the number of the plurality of ribs 42 may be the same. As viewed in the central axis Cx direction, each protrusion 34 may be disposed between the rotation direction Rt of the two ribs 42 adjacent in the rotation direction Rt, and the end portion on the front side in the rotation direction Rt of each protrusion 34 may be disposed on the rear side in the rotation direction Rt with respect to the center Hf in the rotation direction Rt between the two ribs 42 arranged in the rotation direction Rt.

With this configuration, the protrusion 34 is not disposed on the front side in the rotation direction Rt with respect to the center Hf in the rotation direction Rt between the two ribs 42 adjacent in the circumferential direction which is a portion where the inflow airflow Fw is large. Thus, it is possible to suppress the increase in the channel resistance with respect to the airflow Fw, and it is possible to suppress the decrease in the blowing efficiency. In particular, it is possible to suppress the decrease in the blowing efficiency at a low flow rate which is easily affected by the shape of the channel.

Figure 8:
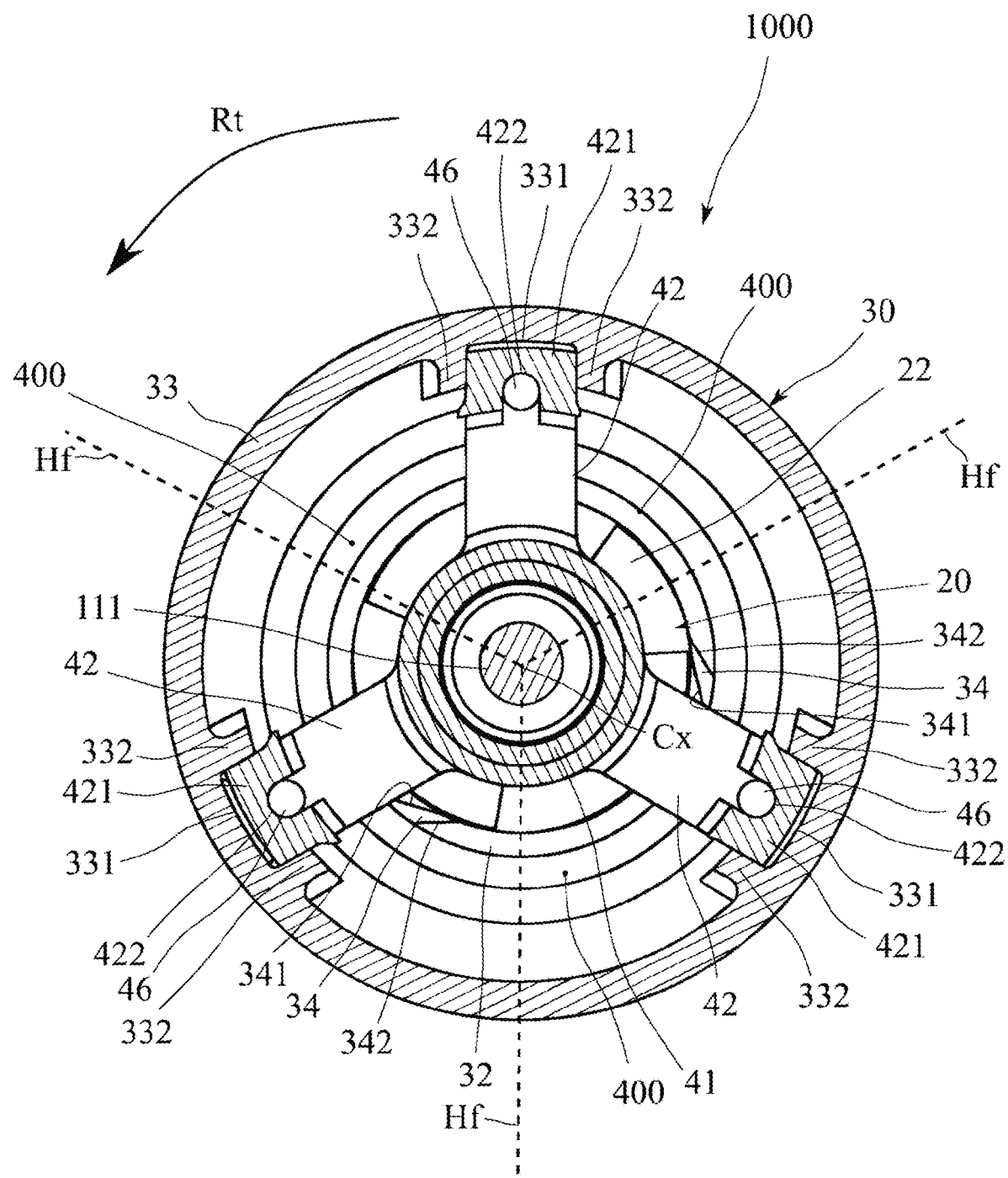
FIG. 8 is a cross-sectional view taken along a cross section orthogonal to a central axis of a blower apparatus according to a modification example of an example embodiment of the present disclosure.

FIG. 8 is a cross-sectional view taken along a cross section orthogonal to a central axis Cx of a blower apparatus 1000 of a modification example. In the blower apparatus 1000 shown in FIG. 8, although the number of protrusions 34 is smaller than the number of ribs 42, the blower apparatus 1000 shown in FIG. 8 has the same configuration as the blower apparatus 100 shown in FIG. and the like for the other portions. Thus, in the blower apparatus 1000, substantially the same portions as those of the blower apparatus 100 are denoted by the same reference numerals, and the detailed descriptions of same portions will be omitted.

As illustrated in FIG. 8, the number of protrusions 34 is two, and is smaller than the number of ribs 42. In the blower apparatus 1000, the number of the protrusions 34 is not the same as the number of the ribs 42. In this configuration, each protrusion 34 is disposed below a different rib 42. That is, a part of the at least one protrusion 34 overlaps the rib 42 in the axial direction, and the end portion of the protrusion 34 on the front side in the rotation direction Rt is disposed on the front side in the rotation direction Rt with respect to the rib 42. With this configuration, it is possible to effectively suppress the vortex which is likely to be generated below the rib 42, and it is possible to suppress the decrease in the blowing efficiency. The number of protrusions 34 overlapping with one rib 42 in the axial direction is one. The protrusion 34 is disposed for each rib 42 in this manner, and thus, the opening 400 between the adjacent ribs 42 can be widely maintained. Accordingly, the decrease in the blowing efficiency can be suppressed.

In addition, a front end of the at least one protrusion 34 in the rotation direction Rt may be disposed on the rear side in the rotation direction Rt with respect to the center Hf in the rotation direction Rt between the two ribs 42 arranged in the rotation direction Rt and on the front side with respect to the rib 42 disposed immediately on the rear side in the rotation direction Rt.

With this configuration, the airflow Fw flowing from the lower side to the upper side of the blade 22 which is likely to be generated below the rib 42 is directed in the direction of the central axis Cx by the protrusion 34. Thus, it is possible to suppress the increase in the channel resistance with respect to the airflow Fw, and it is possible to suppress the decrease in the blowing efficiency. In addition, the protrusion 34 is not disposed in front of the center Hf in the rotation direction Rt, and thus, the channel of the airflow Fw flowing into the enlarged portion 32 can be widened. Accordingly, the decrease in the blowing efficiency can be suppressed.

One protrusion 34 is disposed between the rotation directions Rt of the two ribs 42 adjacent in the rotation direction Rt. With this configuration, the channel into which the airflow Fw flows can be widened. Thus, in particular, it is possible to suppress the decrease in the blowing efficiency at the low flow rate which is easily affected by the shape of the channel.

Figure 9:
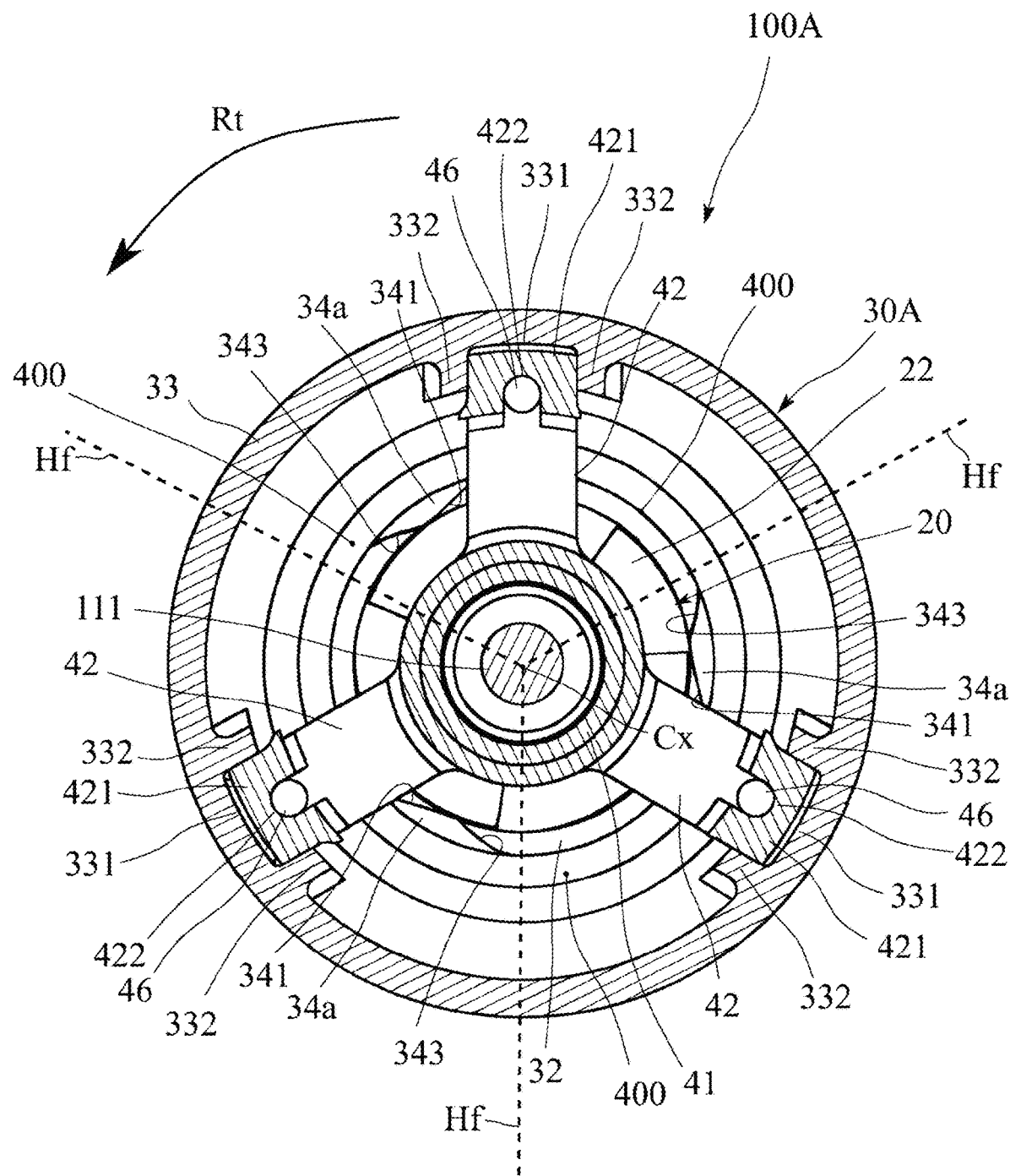
FIG. 9 is a cross-sectional view taken along a cross section orthogonal to a central axis of a blower apparatus including a housing having a protrusion according to a modification example of an example embodiment of the present disclosure.

FIG. 9 is a cross-sectional view taken along a cross section orthogonal to a central axis Cx of a blower apparatus 100A having a housing 30A having a protrusion 34a of a modification example. As illustrated in FIG. 9, in the housing 30A, a shape of a surface 343 on the front side in the rotation direction Rt of the protrusion 34a, that is, a front surface 343 is different from the front surface 342 of the protrusion 34 illustrated in FIG. 5. The other portions of the protrusion 34a are the same as those of the protrusion 34. Thus, substantially the same portions as those of the protrusion 34 of the protrusion 34a are denoted by the same reference numerals, and the detailed description of the same portions will be omitted.

As illustrated in FIG. 9, the surface 343 of the protrusion 34a on the front side in the rotation direction Rt separates from the central axis Cx as it goes to the front side in the rotation direction Rt. With this configuration, the rigidity of the protrusion 34a can be enhanced. In addition, it is possible to suppress turbulence generated when the airflow Fw separates from the front end of the surface 341 in the rotation direction Rt on the rear side in the rotation direction Rt of the protrusion 34a, and it is possible to suppress the decrease in the inflow amount of the airflow Fw, that is, the blowing efficiency.

Figure 10:
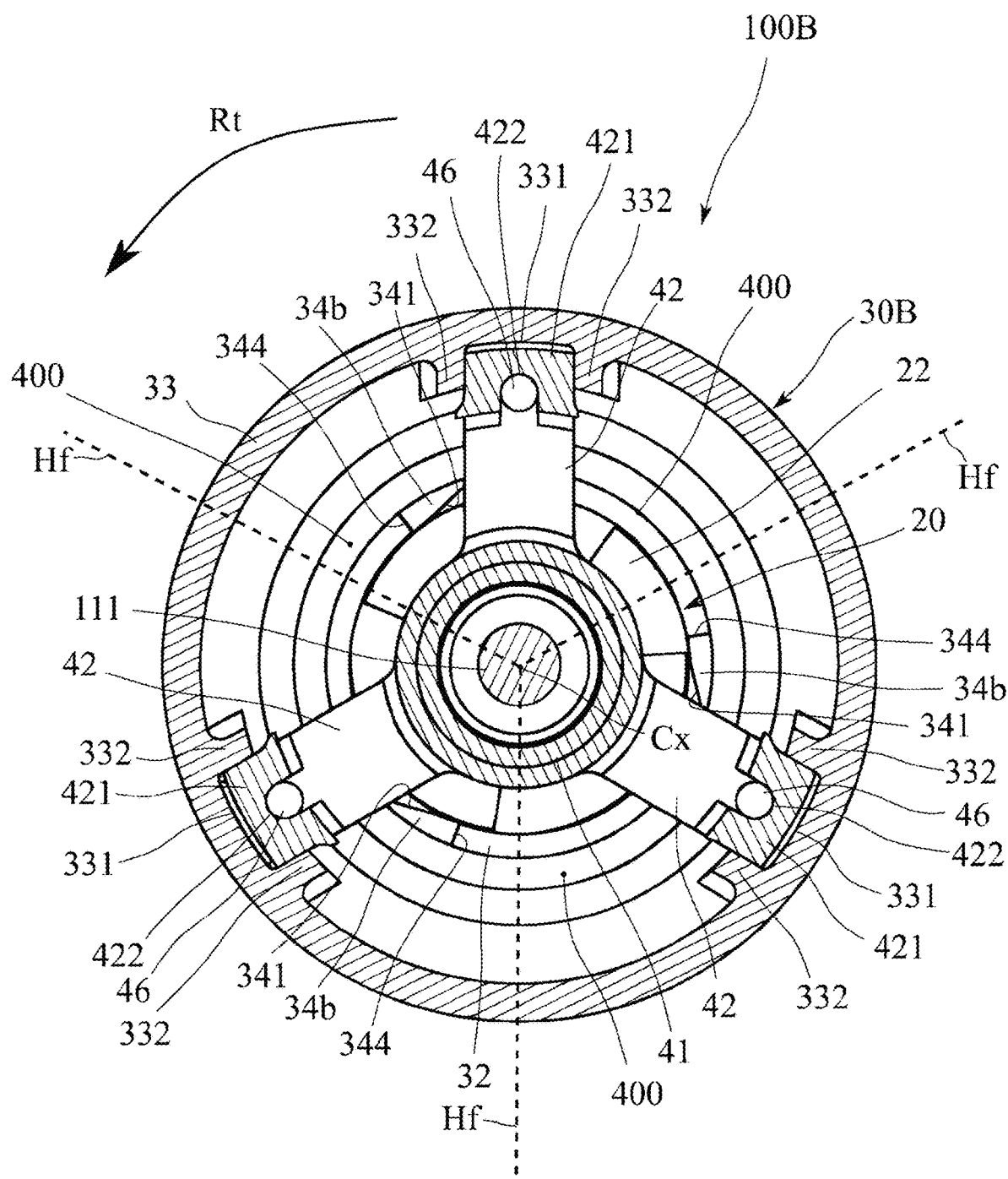
FIG. 10 is a cross-sectional view taken along a cross section orthogonal to a central axis of a blower apparatus including a housing having a protrusion according to a modification example of an example embodiment of the present disclosure.

FIG. 10 is a cross-sectional view taken along a section orthogonal to a central axis Cx of a blower apparatus 100B including a housing 30B having a protrusion 34b of a modification example. As illustrated in FIG. 10, in the housing 30B, a shape of a surface 344 on the front side in the rotation direction Rt of the protrusion 34b, that is, a front surface 344 is different from the front surface 342 of the protrusion 34 illustrated in FIG. 5. The other portions of the protrusion 34b are the same as those of the protrusion 34. Thus, substantially the same portions as those of the protrusion 34 of the protrusion 34b are denoted by the same reference numerals, and the detailed description of the same portions will be omitted.

As illustrated in FIG. 10, the surface 344 on the front side in the rotation direction Rt of the protrusion 34b overlaps a plane including the central axis Cx. With this configuration, the rigidity of the protrusion 34b can be enhanced. In addition, it is possible to suppress the turbulence generated when the airflow Fw separates from the front end of the surface 341 in the rotation direction Rt on the rear side in the rotation direction Rt of the protrusion 34b, and it is possible to suppress the decrease in the inflow amount of the airflow Fw, that is, the blowing efficiency.

Figure 11:
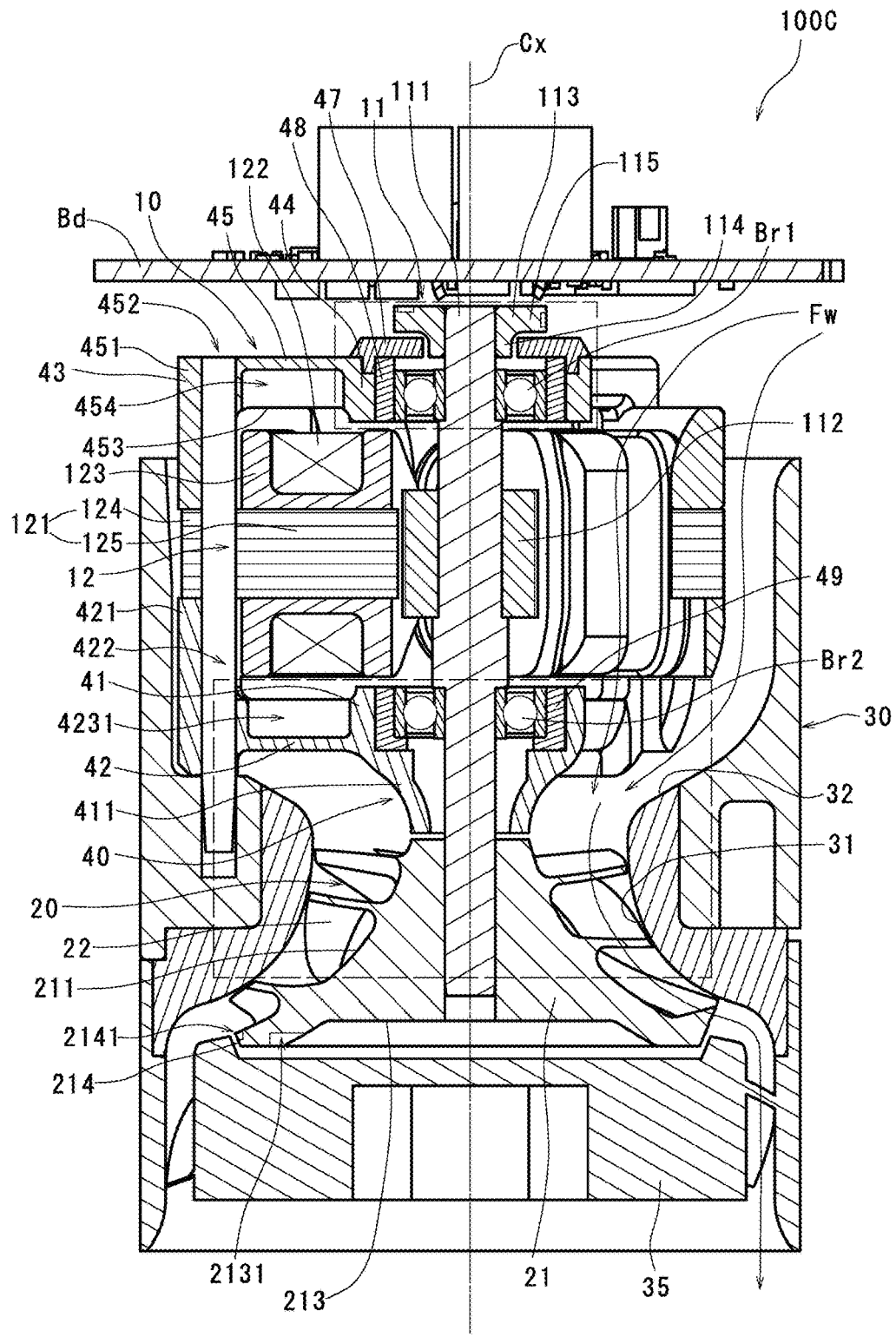
FIG. 11 is a longitudinal cross-sectional view of a blower apparatus according to a second example embodiment of the present disclosure.

FIG. 11 is a longitudinal cross-sectional view of a blower apparatus 100C according to a second example embodiment. As illustrated in FIG. 11, the blower apparatus 100C is different from the structure of the blower apparatus 100 in structures of a motor cover 43 and a motor housing 40 to be described later, and other structures are similar to the structure of the blower apparatus 100. Thus, substantially the same portions as those of the blower apparatus 100 are denoted by the same reference numerals, and the detailed description of the same components will be omitted.

Figure 12:
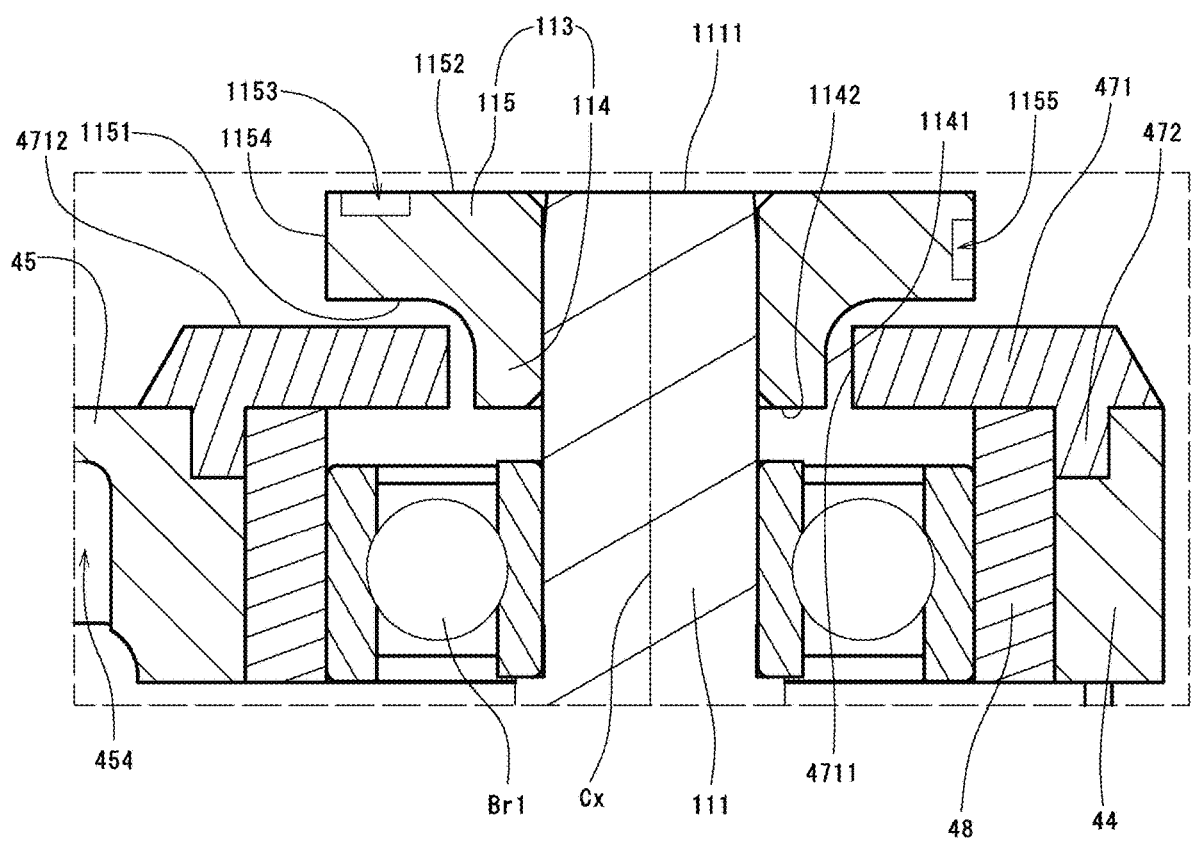
FIG. 12 is an enlarged view of a broken line portion on an upper side illustrated in FIG. 11.
Figure 13:
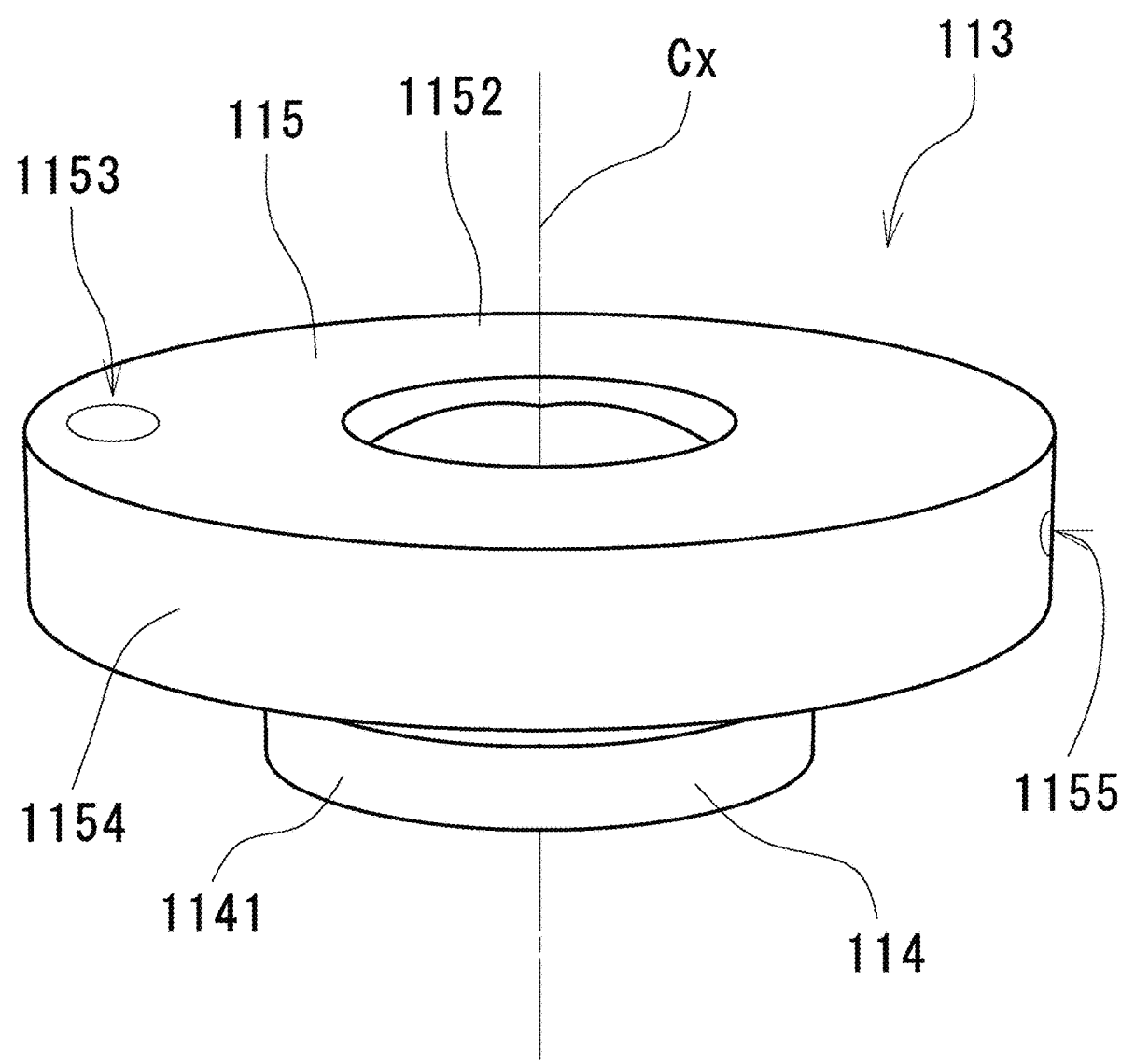
FIG. 13 is a plan perspective view of an annulus of the second example embodiment.
Figure 14:
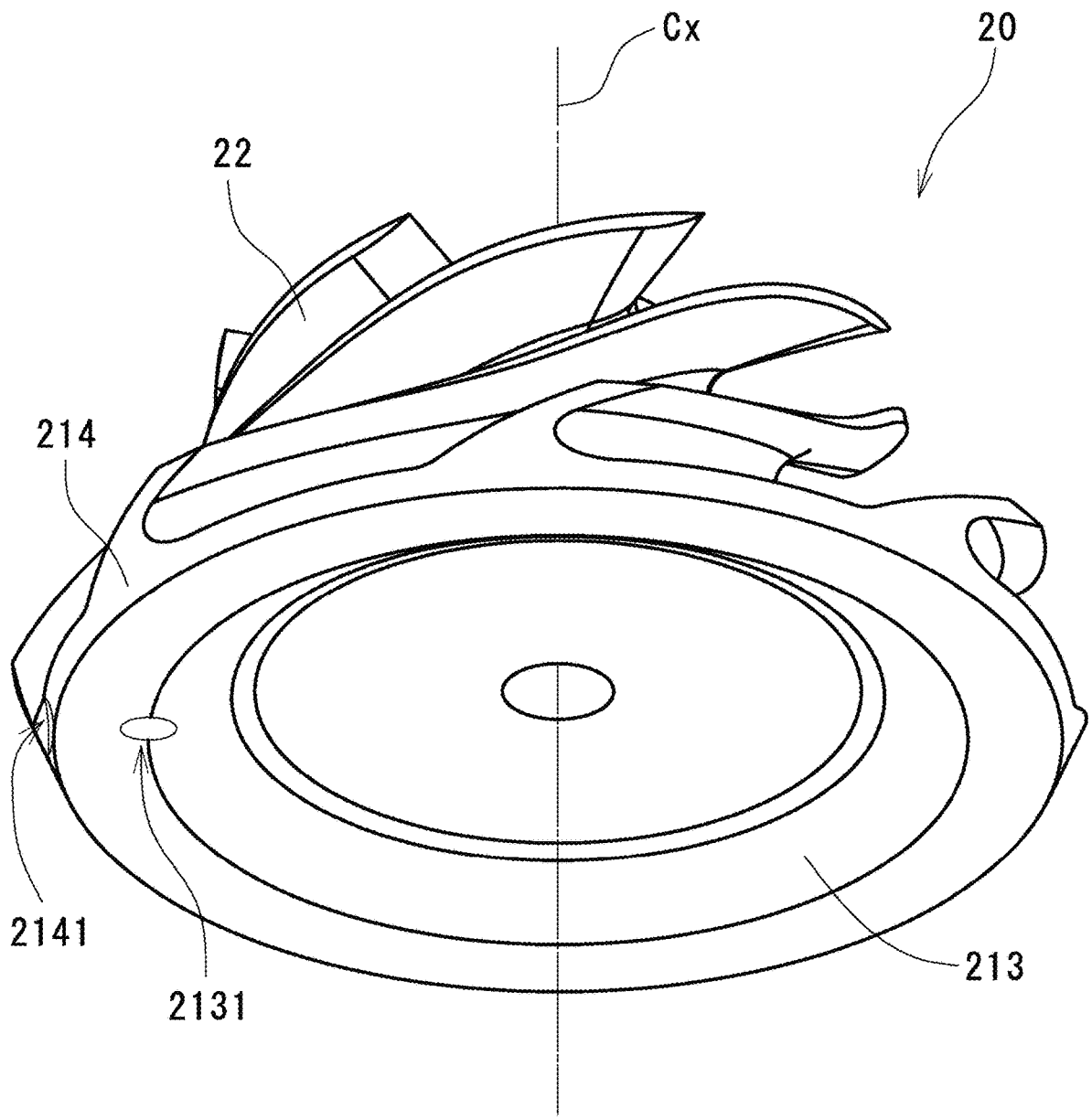
FIG. 14 is a bottom perspective view of an impeller of the second example embodiment.

FIG. 12 is an enlarged view of a broken line portion on an upper side illustrated in FIG. 11. FIG. 13 is a plan perspective view of an annulus 113 of the second example embodiment. FIG. 14 is a bottom perspective view of an impeller 20 of the second example embodiment. As illustrated in FIGS. 11 to 14, the blower apparatus 100C includes a motor 10, the impeller 20, and a housing 30. The motor 10 includes a rotor 11 and a stator 12. The rotor includes a shaft 111 disposed along a vertically extending central axis Cx. The rotor 11 includes a rotor core 112. The stator 12 is disposed to face the rotor 11 in the radial direction. That is, the rotor core 112 faces the stator 12 in the radial direction.

The stator 12 has a stator core 121, coils 122, and insulators 123. The stator core 121 includes an annular core back 124 and a plurality of teeth 125. The core back 124 surrounds the central axis Cx. In the motor 10, a center of the core back 124 is disposed on the central axis Cx. The plurality of teeth 125 extends from the core back 124 in the radial direction. The insulator 123 covers at least a part of the stator core 121. The coils 122 are formed by winding conductive wires around the teeth 125 via the insulators 123.

The housing 30 surrounds the outer side of the impeller in the radial direction. The housing 30 includes a shroud portion 31 and an enlarged portion 32. The shroud portion 31 is disposed on the outer side of the impeller 20 in the radial direction. An inner surface of the shroud portion 31 in the radial direction extends to the inner side in the radial direction as it goes to the upper side. That is, the inner surface of the shroud portion 31 in the radial direction is disposed along upper edges of a plurality of blades 22 to be described later. The enlarged portion 32 is disposed above the shroud portion 31. The inner surface of the enlarged portion 32 in the radial direction extends to the outer side in the radial direction as it goes to the upper side.

An upper end on the inner surface of the shroud portion 31 in the radial direction and a lower end on the inner surface of the enlarged portion 32 in the radial direction are smoothly connected. Accordingly, in a region where the upper end of the shroud portion 31 and the lower end of the enlarged portion 32 are connected, gas smoothly flows from the upper side to the lower side on the inner surface of the enlarged portion 32 in the radial direction and the inner surface of the shroud portion 31 in the radial direction. Thus, it is possible to suppress the generation of the turbulent in the region where the upper end of the shroud portion 31 and the lower end of the enlarged portion 32 are connected.

The impeller 20 is fixed to a lower end portion of the shaft 111. In the blower apparatus 100C, the impeller 20 is disposed below the motor housing 40 and is fixed to the shaft 111. The impeller 20 includes a base portion 21 and a plurality of blades 22. The base portion 21 is a portion that widens in a direction intersecting the central axis Cx. In the present example embodiment, an upper surface 211 of the base portion 21 is a smooth curved surface that widens to the outer side in the radial direction as it goes to the lower side. The plurality of blades 22 is arranged in the circumferential direction on an upper surface 211 of the base portion 21. The impeller may further include a shroud that widens in a direction intersecting the central axis, and upper end portions of the plurality of blades may be connected to the shroud.

The annulus 113 is fixed to an upper end portion of the shaft 111. The annulus 113 includes a tubular portion 114 and a flange portion 115. The tubular portion 114 is fixed to the shaft 111 and has a tubular shape extending in the axial direction. The flange portion 115 widens to the outer side in the radial direction from an upper end portion of the tubular portion 114.

In the blower apparatus 100C, the balance of the rotor 11 can be corrected by machining at least one of at least a part of the annulus 113 and at least a part of the impeller 20. In particular, since the annulus 113 is fixed to the upper end portion of the shaft 111 and the impeller 20 is fixed to the lower end portion of the shaft 111, it is easy to correct the balance of the rotor 11 by adjusting weights of the upper end portion and the lower end portion of the rotor 11. In addition, since the annulus 113 is disposed above the rotor core 112 and the impeller 20 is disposed below the rotor core 112, the balance of the rotor 11 can be corrected in a state in which the impeller 20 is fixed to the shaft 111, and workability is improved. That is, it is not necessary to correct the balance of the rotor 11 in a state in which the impeller 20 is not fixed to the shaft 111 and it is not necessary to correct the balance of the rotor 11 again in a state in which the impeller 20 is fixed to the shaft 111. When the blower apparatus 100C is assembled, since the balance can be corrected even after all the members other than the circuit board Bd and the flow rectifying portion 35 are assembled, the balance of the rotor 11 can be corrected as close as possible to the completed body of the blower apparatus 100C.

The vacuum cleaner A shown in FIG. 1 may include the above-described blower apparatus 100C. Accordingly, the balance of the rotor 11 can be easily corrected in the blower apparatus 100C mounted on the vacuum cleaner A.

When the balance correction is performed, for example, at least one of an upper surface 1152 of the annulus 113 and an outer surface 1154 in the radial direction may be cut. That is, recesses 1153 and 1155 are formed in at least one of the upper surface 1152 of the annulus 113 and the outer surface 1154 in the radial direction. Accordingly, the balance of the rotor 11 can be corrected by a simple work. In the blower apparatus 100C, although both the recess 1153 on the upper surface 1152 and the recess 1155 on the outer surface 1154 in the radial direction are formed, only one of the recess 1153 and the recess 1155 may be formed.

When the balance correction is performed, at least one of a lower surface 213 of the base portion 21 and an outer edge 214 of the base portion 21 in the radial direction can be cut. That is, recesses 2131 and 2141 are formed in at least one of the lower surface 213 of the base portion 21 and the outer edge 214 of the base portion 21 in the radial direction. Accordingly, the balance of the rotor 11 can be corrected by a simple work. Both the annulus 113 and the impeller 20 are cut, and thus, the balance between the two surfaces of the rotor 11 can be efficiently corrected. In the blower apparatus 100C, although both the recess 2131 of the lower surface 213 and the recess 2141 of the outer edge 214 in the radial direction are formed, only one of the recess 2131 and the recess 2141 may be formed.

In the blower apparatus 100C, the upper surface 1152 of the annulus 113 is flush with an upper end 1111 of the shaft 111. The upper surface 1152 of the annulus 113 may be disposed above the upper end 1111 of the shaft 111. Accordingly, the workability of the balance correction of the rotor 11 is improved. That is, when a part of the annulus 113 is cut, the upper end 1111 of the shaft 111 protrudes to the upper side from the upper surface 1152 of the annulus 113, and it is possible to suppress deterioration in the workability. The upper surface 1152 of the annulus 113 may be disposed below the upper end 1111 of the shaft 111.

The blower apparatus 100C includes the motor cover 43. At least a part of the motor cover 43 is disposed on the outer side of the stator 12 in the radial direction. The motor cover 43 has an upper bearing holding portion 44 having a tubular shape and extending in the axial direction. The upper bearing holding portion 44 is disposed above the stator 12. The motor cover 43 has a plurality of upper ribs 45. The plurality of upper ribs 45 extends to the outer side in the radial direction from the upper bearing holding portion 44 and is arranged in the circumferential direction.

A recess 454 recessed to the upper side is formed on a lower surface 453 of the upper rib 45. Accordingly, air above the upper rib 45 smoothly flows to the lower side through between the plurality of upper ribs 45 in the circumferential direction. In addition, the weight of the upper rib 45 can be reduced. That is, in the blower apparatus 100C, the impeller 20 is disposed below the stator 12 and is fixed to the shaft 111. Thus, the gas above the impeller 20 is sucked to the lower side. At this time, the gas above the upper rib 45 is also sucked to the lower side by the impeller 20. Here, when the recess is formed on the upper surface of the upper rib, a part of the gas may enter the recess on the upper surface of the upper rib, and the turbulent flow may be generated in the vicinity of the recess. However, in the blower apparatus 100C, since the recess 454 is formed in the lower surface 453 of the upper rib 45, when the gas flows to the lower side of the upper rib 45 in the circumferential direction, the entrance of the gas from entering the recess 454 is suppressed, and thus, it is possible to suppress the generation of the turbulence around the upper rib 45. When the coils 122 are arranged below the upper rib 45, a sufficient gap can be secured between the axial directions of the coil 122 and the upper rib 45 by forming the recess 454 in the lower surface 453 of the upper rib 45.

The upper bearing Br1 is disposed on the inner side of the upper bearing holding portion 44 in the radial direction. The upper bearing Br1 rotatably supports the shaft 111 around the central axis Cx. In the blower apparatus 100C, the upper bearing Br1 is a ball bearing, and the outer ring of the upper bearing Br1 is fixed to the inner surface of the upper bearing holding portion 44 in the radial direction via an upper bush 48. The upper bearing may be a bearing other than the ball bearing, or may be directly fixed to the inner surface of the upper bearing holding portion in the radial direction.

The blower apparatus 100C includes an upper bearing cover 47. The upper bearing cover 47 includes a top surface portion 471 expanding in the radial direction and a protrusion 472 that widens to the lower side from a lower surface of the top surface portion 471. The protrusion 472 is fixed to an upper surface of the upper bearing holding portion 44. That is, the upper bearing cover 47 is fixed to the upper bearing holding portion 44 and has the top surface portion 471 that widens in the radial direction. The upper bearing cover may be configured such that the top surface portion is directly fixed to the upper bearing holding portion, or may be fixed to the upper bearing holding portion via another member.

A lower surface 1142 of the tubular portion 114 faces the upper surface of the upper bearing Br1 in the axial direction. Accordingly, it is possible to suppress intrusion of foreign matter into the upper bearing Br1. That is, the annulus 113 is fixed to the shaft 111 above the upper bearing Br1, and the tubular portion 114 narrows a space above the upper bearing Br1. Thus, it is possible to suppress the intrusion of the foreign matter into the upper bearing Br1 as compared with a case where there is no tubular portion 114 and there is a wide space above the upper bearing Br1.

An inner surface 4711 of the top surface portion 471 in the radial direction faces, in the radial direction, an outer surface 1141 of the tubular portion 114 in the radial direction. Accordingly, it is possible to suppress the intrusion of the foreign matter into the upper bearing Br1. That is, a gap in the radial direction between the inner surface 4711 of the top surface portion 471 in the radial direction and the outer surface 1141 of the tubular portion 114 in the radial direction is narrowed, and thus, it is possible to suppress the intrusion of the foreign matter into the upper bearing Br1 from the space above the top surface portion 471. The tubular portion 114 may be disposed above the top surface portion 471, and the inner surface 4711 of the top surface portion 471 in the radial direction may face, in the radial direction, the outer surface of the shaft 111 in the radial direction above the upper bearing Br1. Accordingly, it is possible to suppress the intrusion of the foreign matter into the upper bearing Br1 from the space above the top surface portion 471.

An upper surface 4712 of the top surface portion 471 faces a lower surface 1151 of the flange portion 115 in the axial direction. Accordingly, it is possible to suppress the intrusion of the foreign matter into the upper bearing Br1. That is, a gap in the axial direction between the upper surface 4712 of the top surface portion 471 and the lower surface 1151 of the flange portion 115 is narrowed, and thus, it is possible to suppress the foreign matter from passing through the vicinity of the upper surface 4712 of the top surface portion 471 from the space above the top surface portion 471 and entering the upper bearing Br1.

Figure 15:
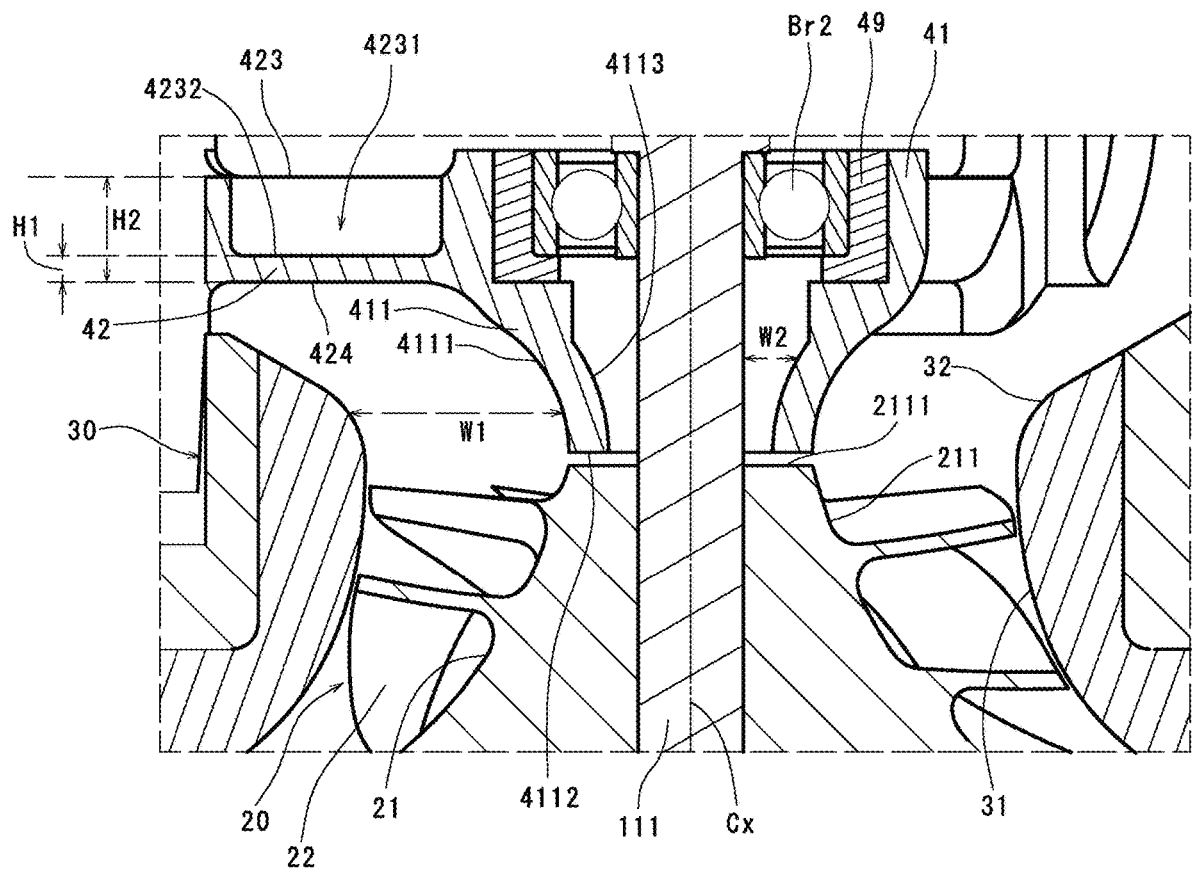
FIG. 15 is an enlarged view of a broken line portion on a lower side illustrated in FIG. 11.
Figure 16:
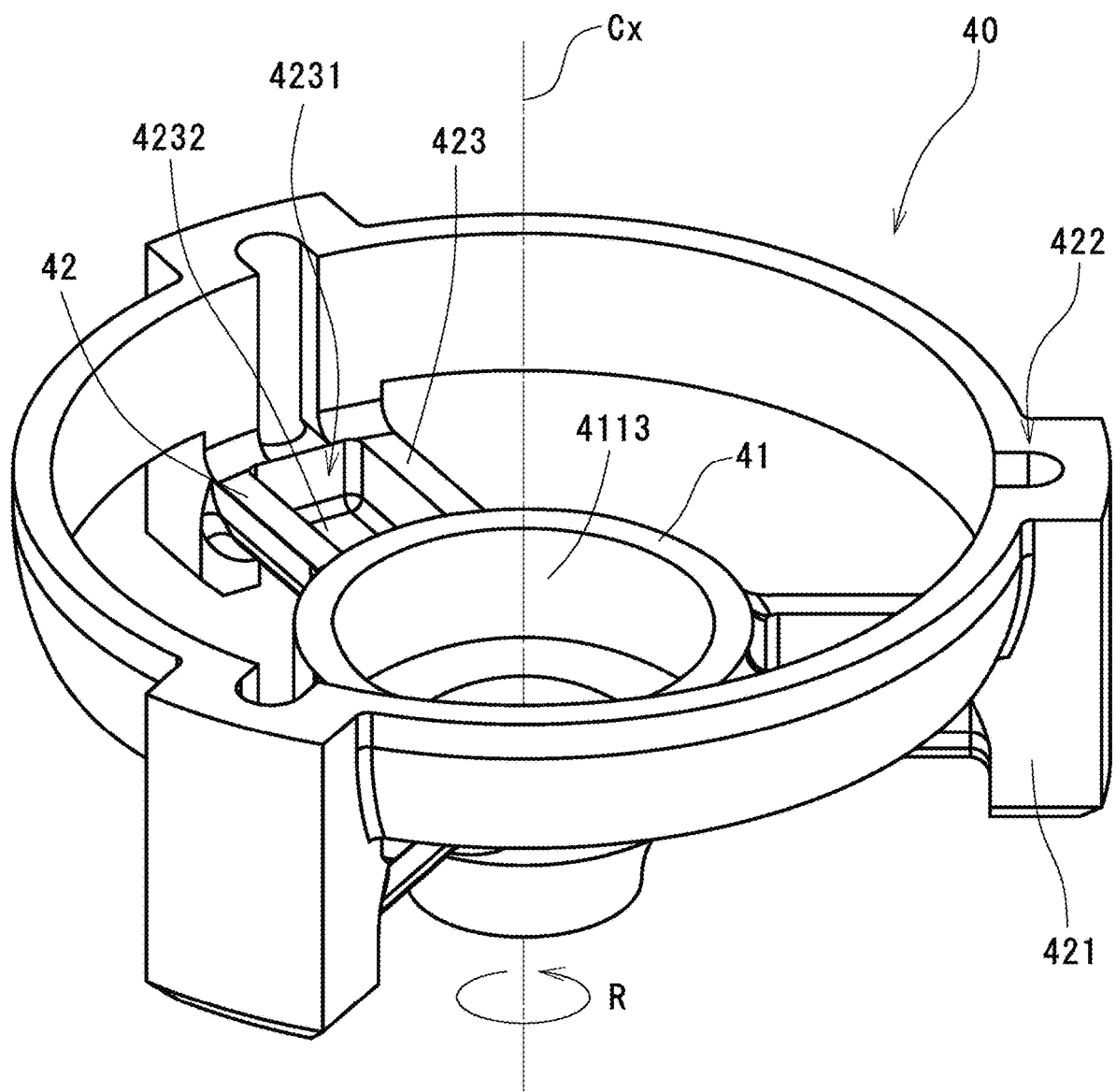
FIG. 16 is a plan perspective view of a motor housing of the second example embodiment.
Figure 17:
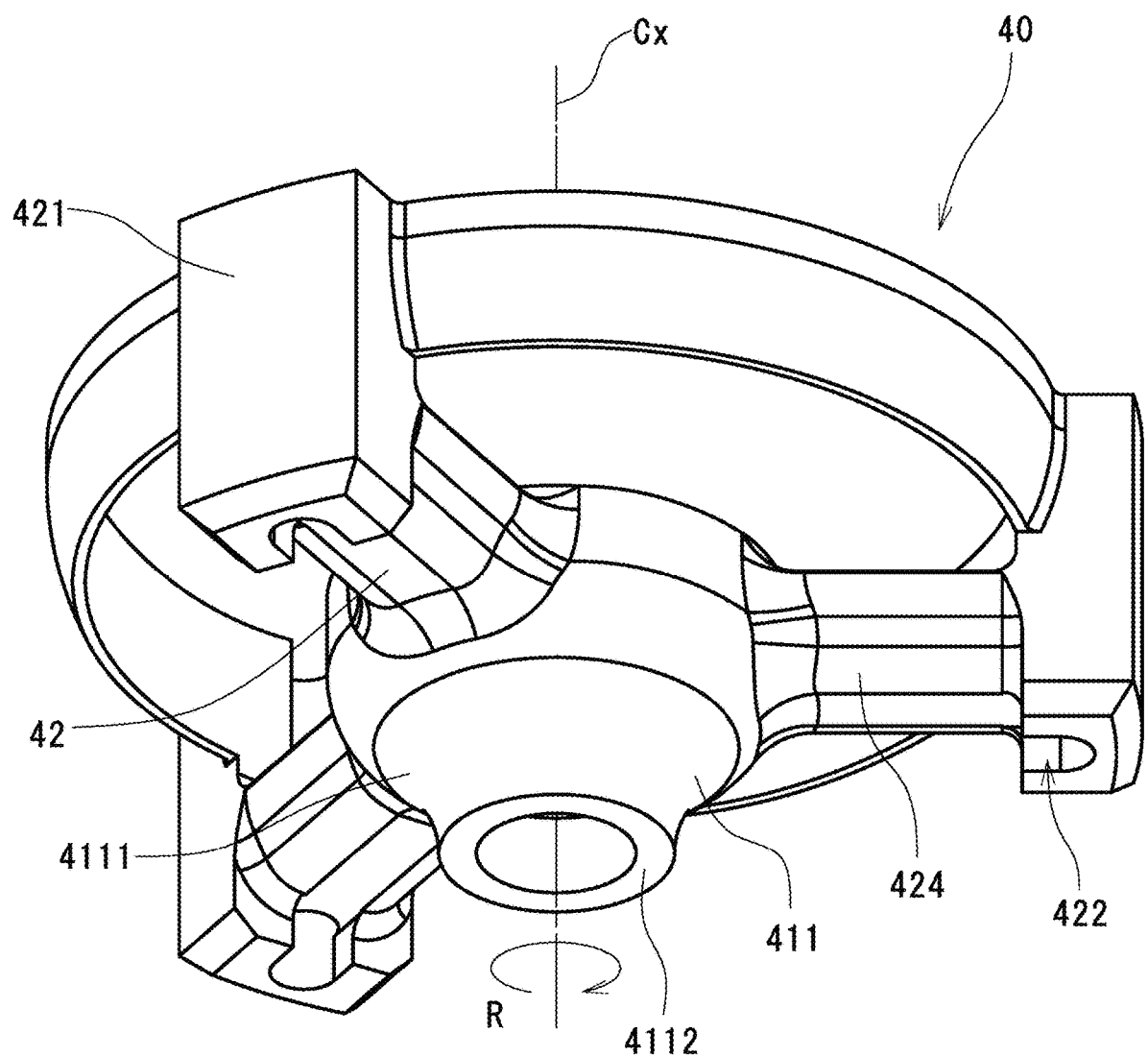
FIG. 17 is a bottom perspective view of the motor housing of the second example embodiment.

FIG. 15 is an enlarged view of a broken line portion on a lower side illustrated in FIG. 11. FIG. 16 is a plan perspective view of the motor housing 40 of the second example embodiment. FIG. 17 is a bottom perspective view of the motor housing 40 of the second example embodiment.

Referring to FIGS. 11, 15, 16, and 17, the blower apparatus 100C includes the motor 10, the impeller 20, the housing 30, and the motor housing 40. The motor housing 40 is disposed below the stator 12. The impeller 20 is disposed below the motor housing 40 and is fixed to the shaft 111.

The motor housing 40 includes a bearing holding portion 41 and an extending portion 411. The bearing holding portion 41 has a tubular shape extending in the axial direction. The extending portion 411 extends to the lower side from the bearing holding portion 41. In the blower apparatus 100C, the motor housing 40 includes the bearing holding portion 41 and a plurality of ribs 42. The plurality of ribs 42 extends in a direction separated from the central axis Cx from the outer surface of the bearing holding portion 41 in the radial direction. The lower bearing Br2 is disposed on the inner side of the bearing holding portion 41 in the radial direction. In the blower apparatus 100C, the lower bearing Br2 is a ball bearing, and the outer ring of the lower bearing Br2 is fixed to the inner surface of the bearing holding portion 41 in the radial direction via a lower bush 49. The lower bearing Br2 rotatably supports the shaft 111 around the central axis Cx. The outer ring of the bearing may be directly fixed to the inner surface of the bearing holding portion in the radial direction, and the bearing may be a bearing other than the ball bearing.

A recess 4231 recessed to the lower side is formed on an upper surface 423 of the rib 42. Accordingly, the weight of the rib 42 can be reduced. In addition, it is possible to suppress the generation of the turbulence around the rib 42. In the blower apparatus 100C, the gas below the rib 42 is sucked to the inner side in the radial direction and the lower side by the impeller 20. At this time, when the recess recessed to the upper side is formed on the lower surface of the rib, a part of the gas flowing below the rib enters the recess, and the turbulence may occur around the recess. In the blower apparatus 100C, since the recess 4231 is formed on the upper surface 423 of the rib 42, the turbulence is less likely to be generated in the airflow Fw flowing below the rib 42. Accordingly, it is possible to suppress the decrease in the blowing efficiency of the blower apparatus 100C.

The vacuum cleaner A shown in FIG. 1 may include the above-described blower apparatus 100C. Accordingly, it is possible to suppress the decrease in the blowing efficiency in the blower apparatus 100C mounted on the vacuum cleaner A. In addition, the weight of the blower apparatus 100C can be reduced.

The recess 4231 faces the coil 122 in the axial direction. That is, a lower surface of the coil 122 faces a bottom surface 4232 of the recess 4231 in the axial direction. Accordingly, it is possible to suppress an increase in a length of the blower apparatus 100C in the axial direction while securing a sufficient distance between the coil 122 and the rib 42. In the blower apparatus 100C, the teeth 125 and the ribs 42 are arranged at equal intervals in the circumferential direction. That is, three teeth 125 are arranged in the circumferential direction at intervals of 120 degrees around the central axis Cx. Three ribs 42 are arranged in the circumferential direction at intervals of 120 degrees around the central axis Cx. Each of the teeth 125 and each of the ribs 42 face each other in the axial direction. That is, the three teeth 125 and the three ribs 42 overlap each other in the axial direction. Accordingly, as compared with a case where the rib 42 is disposed between the coils 122 in the circumferential direction, since the gas easily flows between the coils 122 in the circumferential direction, the coils 122 can be efficiently cooled.

As illustrated in FIG. 17, a lower surface 424 of the rib 42 extends to the lower side as it goes to a front side in a rotation direction R of the impeller 20. In the blower apparatus 100C, the rear side of the lower surface 424 of the rib 42 in the rotation direction R extends to the lower side as it goes to the front side in the rotation direction R. Accordingly, the gas flowing around the lower surface 424 of the rib 42 is smoothly guided to the lower side and the front side in the rotation direction R. Thus, the blowing efficiency of the blower apparatus 100C is improved. The entire lower surface of the rib may extend to the lower side as it goes to the front side in the rotation direction R.

As described above, the housing 30 has the enlarged portion 32. The inner surface of the enlarged portion 32 in the radial direction extends to the outer side in the radial direction as it goes to the upper side. The lower surface 424 of the rib 42 faces, in the axial direction, the inner surface of the enlarged portion 32 in the radial direction. That is, the lower surface 424 of the rib 42 faces the inner surface of the enlarged portion 32 in the radial direction with the gap in the axial direction. Accordingly, the gas flowing below the rib 42 is smoothly guided to the lower side and the inner side in the radial direction along the inner surface of the enlarged portion 32 in the radial direction. Thus, since it is possible to suppress the generation of the turbulence below the rib 42, it is possible to suppress the decrease in the blowing efficiency of the blower apparatus 100C.

As illustrated in FIG. 15, a distance H1 in the axial direction between the bottom surface 4232 of the recess 4231 and the lower surface 424 of the rib 42 is less than or equal to half of a distance H2 in the axial direction between the upper surface 423 of the rib 42 and the lower surface 424 of the rib 42. In other words, a distance in the axial direction from the upper surface 423 of the rib 42 to the bottom surface 4232 of the recess 4231, that is, a depth of the recess 4231 in the axial direction is equal to or more than half of the distance H2 in the axial direction between the upper surface 423 of the rib 42 and the lower surface 424 of the rib 42. Accordingly, since the depth of the recess 4231 of the rib 42 in the axial direction can be set to be sufficiently deep, the weight of the rib 42 can be reduced. Thus, the weight of the blower apparatus 100C can be reduced. In addition, the sufficient gap can be secured between the coil 122 and the rib 42.

An outer surface 4111 of the extending portion 411 in the radial direction extends to the lower side on the inner side in the radial direction. Accordingly, the gas flowing to the outer side of the extending portion 411 in the radial direction smoothly flows toward the impeller 20. Thus, the blowing efficiency of the blower apparatus 100C is improved. In particular, the outer surface 4111 of the extending portion 411 in the radial direction is preferably a smooth curved surface that extends to the inner side in the radial direction as it goes to the lower side and is recessed to the upper side and the inner side in the inner side. Accordingly, the gas flowing to the outer side of the extending portion 411 in the radial direction flows more smoothly toward the impeller 20. Thus, the blowing efficiency of the blower apparatus 100C is further improved.

The vacuum cleaner A shown in FIG. 1 may include the above-described blower apparatus 100C. Accordingly, the blowing efficiency is improved in the blower apparatus 100C mounted on the vacuum cleaner A.

A gap W1 in the radial direction between the outer surface 4111 of the extending portion 411 in the radial direction and the inner surface of the enlarged portion 32 in the radial direction is substantially constant in the axial direction. That is, both the outer surface 4111 of the extending portion 411 in the radial direction and the inner surface of the enlarged portion 32 in the radial direction extend to the inner side in the radial direction as it goes to the lower side, and thus, the gap W1 of the channel in the radial direction formed between the radial directions of the outer surface 4111 of the extending portion 411 in the radial direction and the inner surface of the enlarged portion 32 in the radial direction is substantially constant in the axial direction. Accordingly, since the gap W1 of the channel in the radial direction does not rapidly change in the axial direction, it is possible to suppress the generation of the turbulent flow in the channel.

A lower surface 4112 of the extending portion 411 faces an upper surface 211 of the impeller 20 in the axial direction. More specifically, the lower surface 4112 of the extending portion 411 faces the upper end 2111 of the base portion 21 in the axial direction. Accordingly, since the other member is not disposed between the extending portion 411 and the impeller 20 in the axial direction, it is possible to suppress the generation of the turbulent in the airflow Fw flowing to the lower side on the outer surface 4111 of the extending portion 411 in the radial direction. In addition, the gap in the axial direction between the lower surface 4112 of the extending portion 411 and the upper end 2111 of the base portion 21, and thus, it is possible to suppress the gas from flowing from the inner side of the extending portion 411 in the radial direction toward the outer side of the impeller 20. Thus, since it is also possible to suppress the gas from flowing from above the lower bearing Br2 to the inner side of the extending portion 411 in the radial direction through the lower bearing Br2, it is possible to suppress the intrusion of the foreign matter into the lower bearing Br2.

A lower end on the outer surface 4111 of the extending portion 411 in the radial direction is smoothly connected to an upper end on the upper surface 211 of the base portion 21 via a gap in the axial direction. Accordingly, since the gas flowing to the outer side in the radial direction of the outer surface 4111 of the extending portion 411 in the radial direction smoothly flows to the outer side of the base portion 21 in the radial direction, the blowing efficiency of the blower apparatus 100C is improved.

The inner surface 4113 of the extending portion 411 in the radial direction and the outer surface of the shaft 111 in the radial direction face each other in the radial direction. A gap W2 in the radial direction between the inner surface 4113 of the extending portion 411 in the radial direction and the outer surface of the shaft 111 in the radial direction is the shortest at the lower end. That is, the gap W2 in the radial direction between the inner surface 4113 of the extending portion 411 in the radial direction and the outer surface of the shaft 111 in the radial direction at the lower end of the extending portion 411 is narrower than the gap W2 in the radial direction between the inner surface 4113 of the extending portion 411 in the radial direction and the outer surface of the shaft 111 in the radial direction at the upper end of the extending portion 411. Accordingly, the gap W2 in the radial direction between the inner surface 4113 of the extending portion 411 in the radial direction and the outer surface of the shaft 111 in the radial direction is narrowed, and thus, it is possible to suppress the airflow Fw flowing from the upper side of the lower bearing Br2 to the outer side of the impeller 20 in the radial direction through the lower bearing Br2. Accordingly, it is possible to suppress the intrusion of the foreign matter into the lower bearing Br2. A thickness of an upper end portion of the extending portion 411 in the radial direction is set to be thinned, and thus, the weight of the extending portion 411 can be reduced.

Figure 18:
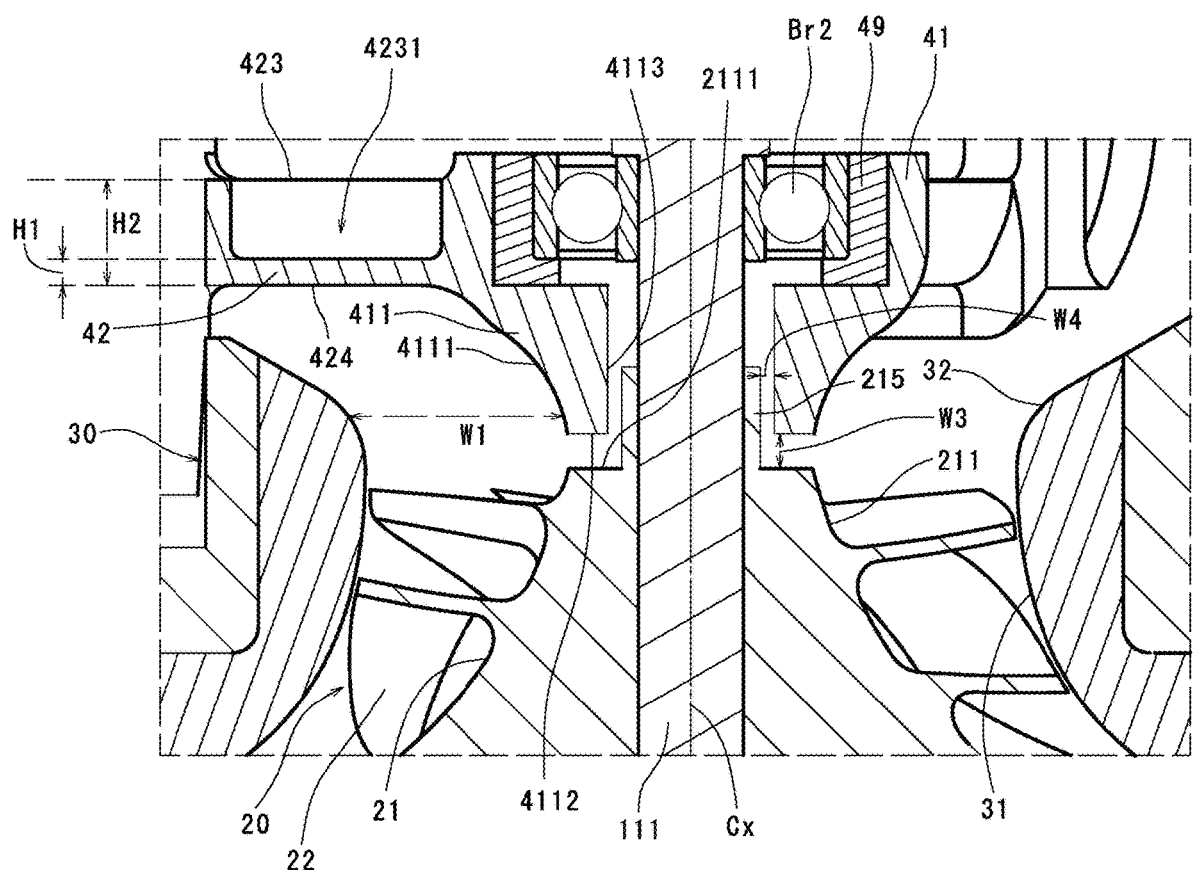
FIG. 18 is an enlarged view illustrating a modification example of the motor housing and the impeller and the vicinity thereof according to an example embodiment of the present disclosure.

FIG. 18 is an enlarged view illustrating a modification example of the motor housing 40 and the impeller 20 and the vicinity thereof. A blower apparatus 100C illustrated in FIG. 18 is different from the blower apparatus 100C illustrated in FIG. 15 in configurations of the motor housing 40 and the impeller 20, and other configurations are the same as those of FIG. 15. Thus, only the above difference will be described below, and description of other portions will be omitted.

In FIG. 18, the upper surface 211 of the base portion 21 has a protrusion 215 protruding to the upper side. The protrusion 215 is a portion protruding to the upper side from an inner end portion of the upper surface 211 of the base portion 21 in the radial direction. The inner surface 4113 of the extending portion 411 in the radial direction faces, in the radial direction, the outer surface of the protrusion 215 in the radial direction. Accordingly, since it is possible to suppress the gas inside the inner surface 4113 of the extending portion 411 in the radial direction from flowing into the space on the outer side of the impeller 20 in the radial direction, it is possible to suppress the decrease in the blowing efficiency of the blower apparatus 100C.

In FIG. 18, the inner surface 4113 of the extending portion 411 in the radial direction extends in parallel with the central axis Cx. The outer surface of the protrusion 215 in the radial direction extends in parallel with the central axis Cx. Thus, a gap W4 in the radial direction between the inner surface 4113 of the extending portion 411 in the radial direction and the outer surface of the protrusion 215 in the radial direction is substantially constant in the axial direction. Accordingly, since it is possible to suppress the gas present on the inner side in the radial direction with respect to the inner surface 4113 of the extending portion 411 in the radial direction from flowing to the outer side of the impeller 20 in the radial direction, it is possible to suppress the decrease in the blowing efficiency of the blower apparatus 100C.

The gap W4 in the radial direction between the inner surface 4113 of the extending portion 411 in the radial direction and the outer surface of the protrusion 215 in the radial direction is narrower than a gap W3 in the axial direction between the lower surface 4112 of the extending portion 411 and the upper surface 211 of the impeller. Accordingly, it is possible to suppress the gas on the inner side in the radial direction from the inner surface 4113 of the extending portion 411 in the radial direction from flowing on the outer side of the impeller 20 in the radial direction. Thus, it is possible to suppress the decrease in the blowing efficiency of the blower apparatus 100C.

While the example embodiments of the present disclosure have been described above, the example embodiments can be modified in various ways within the scope of the present disclosure.

The present disclosure is applicable to a blower and a vacuum cleaner including the blower apparatus.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A blower apparatus comprising:
   a motor that includes a rotor including a shaft extending along a vertically extending central axis, and a stator opposing the rotor in a radial direction;
   an impeller below the stator and fixed to the shaft;
   a housing that includes portions on an outer side of the impeller in the radial direction; and
   a motor housing that supports a bottom of the motor; wherein
   the motor housing incudes:
      a bearing holding portion; and
      an extending portion;
   the bearing holding portion is located below the stator and has a tubular shape extending in an axial direction;
   the extending portion extends towards a lower side of blower apparatus in the axial direction from the bearing holding portion; and
   a radially outer surface of the extending portion extends both axially downward and radially inward.

2. The blower apparatus according to claim 1, wherein the radially outer surface of the extending portion is a smooth curved surface which extends inward in the radial direction as it moves lower in the axial direction and which extends outward in the radial direction as it moves upwards in the axial direction.

3. The blower apparatus according to claim 1, wherein a recess is provided in at least one of a lower surface of a base portion and an outer edge of the base portion in the radial direction.

4. The blower apparatus according to claim 1, wherein the housing includes a shroud portion and an enlarged portion;
   the enlarged portion is located above the shroud portion in the axial direction;
   an inner surface of the enlarged portion in the radial direction extends outward in the radial direction as it extends upwards in the axial direction; and
   a gap in the radial direction between the radially outer surface of the extending portion and the inner surface of the enlarged portion in the radial direction is constant or substantially constant in the axial direction.

5. The blower apparatus according to claim 1, further comprising:
   a motor cover of which at least a portion of which is opposed to an outer side of the stator in the radial direction and that includes an upper bearing holding portion having a tubular shape and extending in the axial direction above the stator; wherein
   an upper bearing that rotatably supports the shaft around the central axis is opposed to an inner side of the upper bearing holding portion in the radial direction.

6. The blower apparatus according to claim 5, wherein the motor cover includes upper ribs extending to an outer side in the radial direction from the upper bearing holding portion and arranged along a circumferential direction; and
   a recess recessed toward an upper side is provided in a lower surface of an upper rib.

7. The blower apparatus according to claim 1, wherein a lower surface of the extending portion opposes an upper surface of the impeller in the axial direction.

8. The blower apparatus according to claim 1, wherein the impeller includes a base portion which extends in a direction intersecting the central axis; and
   radial edges of a lower end of the radially outer surface of the extending portion are aligned with radial edges of an upper surface of the impeller through an axial gap between the base portion and the extending portion.

9. The blower apparatus according to claim 8, wherein a lower radial gap between a radially inner surface of the extending portion and a lower radially outer surface of the shaft is narrower than an upper radial gap between the radially inner surface of the extending portion and an upper radially outer surface of the shaft.

10. A vacuum cleaner comprising the blower apparatus according to claim 1.

* * * * *